US012667100B2

(12) United States Patent
Li et al.

(10) Patent No.: US 12,667,100 B2
(45) Date of Patent: Jun. 30, 2026

(54) COMPOSITION COMPRISING BENZYLAMINE ACARICIDE AND USE THEREOF

(71) Applicant: SHANDONG KANGQIAO BIO-TECHNOLOGY CO., LTD, Binzhou City (CN)

(72) Inventors: Ning Li, Binzhou City (CN); Yingshuai Liu, Binzhou City (CN); Yingrui Cui, Binzhou City (CN); Xiangwei Liu, Binzhou City (CN); Ruibin Liu, Binzhou City (CN); Yunxiao Sun, Binzhou City (CN); Shien Fan, Binzhou City (CN); Yu Chen, Binzhou City (CN); Baohong Liu, Binzhou City (CN); Jiajie Niu, Binzhou City (CN); Jie Gao, Binzhou City (CN); Ruijie Feng, Binzhou City (CN); Qinan Han, Binzhou City (CN); Bin Li, Binzhou City (CN)

(73) Assignee: SHANGDONG KANGIAO BIO-TECHNOLOGY CO., LTD, Binzhou City (CN)

( * ) Notice: Subject to any disclaimer, the term of this patent is extended or adjusted under 35 U.S.C. 154(b) by 410 days.

(21) Appl. No.: 18/264,367

(22) PCT Filed: Jan. 28, 2022

(86) PCT No.: PCT/CN2022/074745
§ 371 (c)(1),
(2) Date: Aug. 4, 2023

(87) PCT Pub. No.: WO2022/166842
PCT Pub. Date: Aug. 11, 2022

(65) Prior Publication Data

US 2024/0138408 A1 May 2, 2024

(30) Foreign Application Priority Data

Feb. 7, 2021 (CN) ......................... 202110169118.7

(51) Int. Cl.

| | |
|---|---|
| ***A01N 41/10*** | (2006.01) |
| ***A01N 37/36*** | (2006.01) |
| ***A01N 41/02*** | (2006.01) |
| ***A01N 43/12*** | (2006.01) |
| ***A01N 43/16*** | (2006.01) |
| ***A01N 43/52*** | (2006.01) |
| ***A01N 43/56*** | (2006.01) |

(Continued)

(52) U.S. Cl.
CPC ............. *A01N 41/10* (2013.01); *A01N 37/36* (2013.01); *A01N 41/02* (2013.01); *A01N 43/12* (2013.01); *A01N 43/16* (2013.01); *A01N 43/52* (2013.01); *A01N 43/56* (2013.01); *A01N 43/653* (2013.01); *A01N 43/713* (2013.01); *A01N 43/76* (2013.01); *A01N 43/78* (2013.01); *A01N 47/10* (2013.01); *A01N 47/20* (2013.01); *A01N 47/30* (2013.01); *A01P 3/00* (2021.08); *A01P 7/02* (2021.08); *A01P 7/04* (2021.08)

(58) Field of Classification Search
CPC ........ A01N 41/10; A01N 37/36; A01N 41/02; A01N 43/12; A01N 43/16; A01N 43/52; A01N 43/56; A01N 43/653; A01N 43/713; A01N 43/76; A01N 43/78; A01N 47/10; A01N 47/20; A01N 47/30; A01P 7/04; A01P 7/02; A01P 3/00
See application file for complete search history.

(56) References Cited

U.S. PATENT DOCUMENTS

| | | | |
|---|---|---|---|
| 4,339,461 | A | 7/1982 | King |
| 2021/0360919 | A1 | 11/2021 | Li et al. |

FOREIGN PATENT DOCUMENTS

| | | | |
|---|---|---|---|
| CN | 108041042 | A | 5/2018 |
| CN | 108290886 | A | 7/2018 |

(Continued)

OTHER PUBLICATIONS

International Search Report and Written Opinion for application PCT/CN2022/074745, dated Apr. 27, 2022 , 9 pages.

*Primary Examiner* — Sahana S Kaup
*Assistant Examiner* — Toriana N. Vigil
(74) *Attorney, Agent, or Firm* — CANTOR COLBURN LLP

(57) ABSTRACT

A composition and use thereof. The composition comprises an active component a and an active component b; the active component a is a compound as shown in general formula A; and the active component b is at least one of compounds which have insecticidal, acaricidal or bactericidal activity and are different from the compound as shown in general formula A. The composition has the advantages of synergistic effect and expanding prevention and treatment spectrum, and can be used for preventing and treating various pests, particularly mite damage, and plant diseases caused by various fungi, bacteria, nematodes and viruses.

(A)

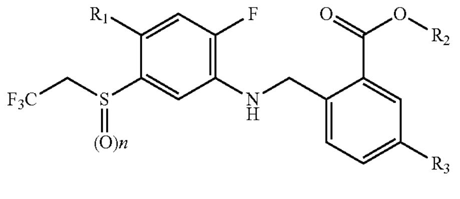

12 Claims, No Drawings

(51) Int. Cl.

| | |
|---|---|
| ***A01N 43/653*** | (2006.01) |
| ***A01N 43/713*** | (2006.01) |
| ***A01N 43/76*** | (2006.01) |
| ***A01N 43/78*** | (2006.01) |
| ***A01N 47/10*** | (2006.01) |
| ***A01N 47/20*** | (2006.01) |
| ***A01N 47/30*** | (2006.01) |
| ***A01P 3/00*** | (2006.01) |
| ***A01P 7/02*** | (2006.01) |
| ***A01P 7/04*** | (2006.01) |

(56) References Cited

FOREIGN PATENT DOCUMENTS

WO 2017055185 A1 4/2017
WO 2018015852 1/2018
WO WO-2018015852 A1 * 1/2018 .............. A61P 33/14

* cited by examiner

COMPOSITION COMPRISING BENZYLAMINE ACARICIDE AND USE THEREOF

CROSS-REFERENCE TO RELATED APPLICATIONS

The present application is a U.S. National Stage Application of Patent Application No. PCT/CN2022/074745 filed Jan. 28, 2022, which claims the benefit of Chinese Application no. 202110169118.7 filed Feb. 7, 2021, the contents of each Application being incorporated herein by reference in their entirety.

FIELD

The present invention relates to the field of pesticides, and specifically relates to a composition comprising benzylamine acaricide and use thereof.

BACKGROUND

In the history of pesticide development, the mixing of pesticides has always been developed along with the development of pesticides. Usually a commercialized pesticide with excellent effect is accompanied by many related blends, and the market value created by the blends is often greater than that of single-agent pesticide.

Insecticides containing a single active component, used continuously in pest control, can easily make pests resistant. By mixing two active components of insecticides and blending them into mixed components in a certain ratio, the effectiveness of prevention can be improved, the amount of active ingredients and costs can be reduced, while the emergence of pest resistance can be delayed. Then, a pesticide composition for simultaneous control of one or more pests and diseases including pests, mites, plant fungal diseases, nematode diseases, bacterial diseases, viral diseases that commonly occur on a variety of plants, can be more effective in saving agricultural costs, improve efficiency and have excellent prospects for market applications. Therefore, the composition with above-mentioned effects has been the goal of constant seeking.

SUMMARY

The purpose of the present invention is to overcome the technical problem of low efficiency of pest control existing in the prior art and provide a composition containing benzylamine acaricide, which has the advantages of increased efficiency and expanded control spectrum.

The compound as shown in general formula A (active component a) can be used for controlling a variety of pests, especially for agricultural mites, and in particular, this class of compounds has good control effect on a variety of mites such as *Tetranychus cinnabarinus* Boi, *Tetranychus urticae* Koch, *Panonychus citri* Mc Gregor, *Panonychus ulmi* Koch, Polyphagotarsonemus *latus* (Banks) and nematode. The inventors of the present invention came up with the present invention by studying the mixing of compounds of general formula A with existing insecticides, acaricides or fungicides, and unexpectedly found that when the active component a is used in combination with active component b, especially in a certain ratio, it has more excellent effect in the control of pests, mites or diseases.

A first aspect of the invention provides a composition comprising an active component a and an active component b, wherein the active component a is a compound as shown in general formula A,

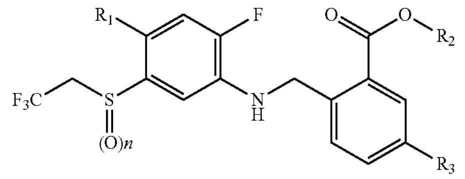

A wherein n is 0 or 1;

$R^1$ is methyl or chlorine;

$R^2$ is methyl, ethyl, propyl, butyl, isopropyl, cyclopropyl, cyclopropylmethyl, allyl, propargyl, fluoroethyl, difluoroethyl, trifluoroethyl, chloroethyl, trichloroethyl, cyanoethyl;

$R^3$ is hydrogen or fluorine;

the active component b is at least one of compounds having insecticidal, acaricidal or bactericidal activity and are different from the compound as shown in general formula A; the active component b is selected from acetylcholinesterase inhibitor insecticide b1, sodium channel modulator insecticide b2, nicotinic acetylcholine receptor agonist insecticide b3, chloride channel agonist insecticide b4, juvenile homone analogues insecticide b5, mite growth inhibitor insecticide b6, plant-derived and bio-derived insecticide b7, ATP synthase inhibitor insecticide b8, oxidative phosphorylation uncoupling agent insecticide b9, nicotinic acetylcholine receptor blocker insecticide b10, insect growth inhibitor insecticide b11, mitochondrial electron transport complex III inhibitor insecticide b12, mitochondrial electron transport complex I inhibitor insecticide b13, voltage-dependent sodium channel blocker insecticide b14, acetyl coenzyme A carboxylase inhibitor insecticide b15, mitochondrial electron transport complex II inhibitor insecticide b16, ichthyidine receptor modulator insecticide b17, GABA-gated chloride channel variant modulator insecticide b18, other insecticide b19, amide fungicide b20, dicarboximide fungicide b21, triazole fungicide b22, imidazole fungicide b23, oxazole fungicide b24, thiazole fungicide b25, morpholine fungicide b26, pyrrole fungicide b27, pyridine fungicide b28, pyrimidine fungicide b29, quinazolinone fungicide b30, carbamate fungicide b31, organophosphorus fungicide b32, thiocarbamate fungicide b33, plant growth regulator b34, copper agent b35, mercury fungicide b36, nematicide b37, bactericide b38 or other fungicide b39.

A second aspect of the present invention provides an use of the composition described in the first aspect in control of pest or disease, in particular in control of mite.

DETAILED DESCRIPTION

Neither the endpoints of the ranges disclosed herein nor any of the values are limited to that precise range or values, and such ranges or values shall be understood to include values close to such ranges or values. For numerical ranges, one or more new numerical ranges may be obtained by combining between endpoint values of individual ranges, between endpoint values of individual ranges and individual point values, and between individual point values with each other, and such numerical ranges shall be deemed to be specifically disclosed herein.

A first aspect of the invention provides a composition comprising an active component a and an active component b, wherein the active component a is a compound of the general formula A,

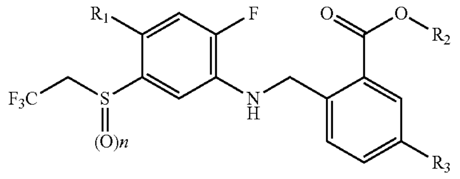

A wherein n is 0 or 1;

$R^1$ is methyl or chlorine;

$R^2$ is methyl, ethyl, propyl, butyl, isopropyl, cyclopropyl, cyclopropylmethyl, allyl, propargyl, fluoroethyl, difluoroethyl, trifluoroethyl, chloroethyl, trichloroethyl, cyanoethyl;

$R^3$ is hydrogen or fluorine;

the active component b is at least one of compounds having insecticidal, acaricidal or bactericidal activity and are different from the compound as shown in general formula A; the active component b is selected from acetylcholinesterase inhibitor insecticide b1, sodium channel modulator insecticide b2, nicotinic acetylcholine receptor agonist insecticide b3, chloride channel agonist insecticide b4, juvenile homone analogues insecticide b5, mite growth inhibitor insecticide b6, plant-derived and bio-derived insecticide b7, ATP synthase inhibitor insecticide b8, oxidative phosphorylation uncoupling agent insecticide b9, nicotinic acetylcholine receptor blocker insecticide b10, insect growth inhibitor insecticide b11, mitochondrial electron transport complex III inhibitor insecticide b12, mitochondrial electron transport complex I inhibitor insecticide b13, voltage-dependent sodium channel blocker insecticide b14, acetyl coenzyme A carboxylase inhibitor insecticide b15, mitochondrial electron transport complex II inhibitor insecticide b16, ichthyidine receptor modulator insecticide b17, GABA-gated chloride channel variant modulator insecticide b18, other insecticide b19, amide fungicide b20, dicarboximide fungicide b21, triazole fungicide b22, imidazole fungicide b23, oxazole fungicide b24, thiazole fungicide b25, morpholine fungicide b26, pyrrole fungicide b27, pyridine fungicide b28, pyrimidine fungicide b29, quinazolinone fungicide b30, carbamate fungicide b31, organophosphorus fungicide b32, thiocarbamate fungicide b33, plant growth regulator b34, copper agent b35, mercury fungicide b36, nematicide b37, bactericide b38 or other fungicide b39.

According to some embodiments of the present invention, the weight ratio of the active component a to active component b may be 150:1-1:150, such as 150:1, 125:1, 105:1, 99:1, 90:1, 85:1, 80:1, 70:1, 60:1, 50:1, 40:1, 30:1, 20:1, 10:1, 8:1, 6:1, 4:1, 2.5:1, 2:1, 1:1, 1:2, 1:2.5, 1:4, 1:6, 1:8, 1:10, 1:20, 1:30, 1:40, 1:50, 1:60, 1:70, 1:80, 1:90, 1:99, 1:105, 1:125, 1:150, or any value therebetween.

The acetylcholinesterase inhibitor insecticide b1 is selected from isoprocarb, carbosulfan, benfuracarb, carbofuran, methomyl, fenobucarb, metolcarb, propoxur, fenoxycarb, bendiocarb, carbaryl, furathiocarb, pirimicarb, alanycarb, aldicarb, butocarboxim, butoxycarboxim, oxamyl, thiodicarb, thiofanox, ethiofencarb, methiocarb, trimethacarb, macbal, meobal, phosphocarb, dimetan, dimetilan, isolan, pyramat, pyrolan, aldoxycarb, nitrilacarb, tazimcarb, allyxycarb, aminocarb, bufencarb, butacarb, cloethocarb, hopcide, dimethacarb, dioxacarb, toxamate, mexacarbate, promacyl, promecarb, fenethacarb, decarbofuran, thiocarboxime, dicresyl, hyquincarb or carbanolate, chlorpyrifos, chlorpyrifos-methyl, triazophos, phoxim, profenofos, prothiofos, sulprofos, methidathion, fenitrothion, malathion, phosalone, diazinon, fenthion, pyraclofos, pyridaphenthione, phosmet, quinalphos, acephate, isophenphos, isoxathion, pyrazoxon, tebupirimfos, phenthoate, bladafum, terbufos, mecarbam, vamidothion, dimethoate, omethoate, tetrachlorvinphos, phosphamidon, dibrom, mevinphos, dipterex, dichlorvos, propetamphos, chlorfenvinphos, cadus afos dicrotophos, dimethylvinphos, propaphos, oxydemeton-methyl, heptenophos, naftalofos, acethion, coumaphos, disulfoton, thiometon, ethion, ethoprophos, isazofos, azinphos-ethyl, azinphos-methyl, famphur, cyanophos, phorate, temephos, parathion, parathion-methyl, methamidophos, ethyl-p-nitrophenyl phenylphosphonothioate, fenamiphos, phosphorothioic acid, calvinphos, crotoxyphos, monocrotophos, naled, ethylpyrophosphate, cyanthoate, fosmethilan, acetophos, phosphorus oxychloride, demephion, demephion-O, demephion-S, demeton, demeton-methyl, oxydemeton-methy, aphidan, isothioate, methacrifos, methylacetophos, oxydeprofos, oxydisulfoton, sulfotep, amidithion, cyanthoate, ethoate-methyl, formothion, omethoate, prothoate, sophamide, chlorphoxim, phoxim-methyl, amamethiphos, colophonate, coumithoate, dioxathion, endothion, azidithion, morphothion, pyraclofos, pyrazothion, pyridaphenthion, dialifos, isoxathion, zolaprofos, pyrazophos, etrimfos, lirimfos, pirimioxyphos, pyrimitate, pirimiphos-methyl, fosthiazate, bromophos, bromophos-ethyl, carbophenothion, chlorthiophos, cyanophos, cythioate, dicapthon, dichlofention, fenchlorphos, fensulfothion, heterophos, jodfenphos, mesulfenfos, phenkapton, butonate, mecarphon, fonofos, trichloronat, cyanofenphos, leptophos, ruelene, fosthietan, mephosfolan, phosfolan, phosfolanm-ethyl, chloramine phosphorus, isocarbophos, isofenphos-methyl, phosglycin, dimefox, mipafox, schradan, phostin, pyraclofos, quintiofos, bromfenvinfos, mazidox, pirimetaphos, prothidathion, azothoate, primidophos, pyrimitate, quinalphos-methyl, athidathion, phosnichlor, trichlormetaphos-3, trifenofos, quinothion, dithicrofos, thicrofos, demeton-methyl, demeton-O-methyl, amiton, butathiofos, demeton-O, chlorprazophos, fospirate, etaphos, fenthion-ethyl or benoxafos.

The sodium channel modulator insecticide b2 is selected from cypermethrin, cyhalothrin, fenpropathrin, fenvalerate, flucythrinate, flumethrin, beta-cyfluthrin, cyfluthrin, bifenthrin, deltamethrin, acrinathrin, alpha-cypermethrin, bioresmethrin, cyhalothrin, permethrin, tau-fluvalinate, allethrin, bioallethrin, cycloprothrin, gamma cyhalothrin, theta-cypermethrin, zeta-cypermethrin, cyphenothrin, empenthrin, esfenvalerate, imiprothrin, meperfluthrin, metofluthrin, dimefluthrin, prallethrin, phenothrin, benflupermethrin, bioresmethrin, cis-permethrin, tefluthrin, tetramethrin, tetramethylfluthrin, tralomethrin, beta-cypermethrin, etofenprox, transfluthrin, S-bioallethrin, bromofenvalerate, brofluthrinate, bromethrin, butethrin, chlorempenthrin, cyclethrin, cyfluthrin, lambda-cyhalothrin, dimethrin, chloroprallethrin, fenfluthrin, fenpirithrin, esfenvalerate, furamethrin, imiprothrin, japothrins, kadethrin, methothrin, pentmethrin, biopermethrin, proparthrin, resmethrin, terallethrin, tralocythrin, valerate, flufenprox, halfenprox, protrifenbute, silafluofen, sulfoxime, sufluoxime, flumethrin, barthrin, bioethanomethrin, fluvalinate, furethrin, heptafluthrin, momfluorothrin, transpermethrin, profluthrin, pyresmethrin, clofenotane, methoxychlor.

The nicotinic acetylcholine receptor agonist insecticide b3 is selected from imidacloprid, thiamethoxam, acetamiprid, dinotefuran, clothianidin, nitenpyram, thiacloprid, imidaclothiz, flonic amid, propyl4-((2-((4,6-dimethoxypyrimidin-2-yl)oxylbenzyllamino)[3,5-2H]benzoate, sulfoxaflor, flupyradifurone, triflumezopyrim, sulfoxaflor.

The chlorine channel agonist insecticide b4 is selected from avermectin, emamectin benzoate, lepimectin, milbemycin.

The juvenile homone analogues insecticide b5 is selected from hydroprene, kinoprene, methoprene, pyriproxyfen, fenoxycarb.

The mite growth inhibitor insecticide b6 is selected from clofentezine, flufenzine, hexythiazox, etoxazole.

The plant-derived and bio-derived insecticide b7 is selected from matrine, azadirachtin, *Bacillus thuringiensis*, beauveria, allicin, neonicotinoids, carvacrol, d-limonene, nicotine, nirnicotine, oxymatrine, pyrethrins, cinerins, cinerin I, cinerin II, jasmolin I, jasmolin II, pyrethrins I, pyrethrins II, quassia, rhodojaponin-III, rotenone, ryania, sabadilla, veratralbine, *Bacillus thuringiensis, Bacillus sphaericus*, sanguinarine or triptolide.

The ATP synthase inhibitor insecticide b8 is selected from diafenthiuron, azocyclotin, cyhexatin, fenbutatin oxide, propargite, tedion.

The oxidative phosphorylation uncoupling agent insecticide b9 is selected from chlorfenapyr, DNOC, sulfluramid.

The nicotinic acetylcholine receptor blocker insecticide b10 is selected from bensultap, cartap, thiocyclam, bisultap.

The insect growth inhibitor b11 is selected from diflubenzuron, lufenuron, hexaflumuron, chlorbenzuron, triflumuron, teflubenzuron, penfluron, noviflumuron, novaluron, flufenoxuron, flucycloxuron, buprofezin, cyromazine, bistrifluron, chlorfluazuron, dichlorbenzuron, flucycloxuron, 3(2H)-Pyridazinone, epofenonane, hydroprene, kinoprene, methoprene, pyriproxyfen, triprene, furan tebufenozide, halofenozide, methoxyfenozide, tebufenozide, 1,2-dibenzoyl-1-(t-butyl)hydrazine, chromafenozide, α-ecdysone, ecdysterone, difenolan, precocene I, precocene II, juvenile hormone I, juvenile hormone II, juvenile hormone III.

The mitochondrial electron transport complex III inhibitor insecticide b12 is selected from hydramethylnon, acequinocyl, fluacrypyrim, pyriminostrobin, bifenazate.

The mitochondrial electron transport complex I inhibitor insecticide b13 is selected from fenazaquin, fenpyroximate, pyrimidifen, tebufenpyrad, pyridaben, tolfenpyrad, rotenone.

The voltage-dependent sodium channel blocker insecticide b14 is selected from indoxacarb, metaflumizone.

The acetyl coenzyme A carboxylase inhibitor insecticide b15 is selected from spirodiclofen, spiromesifen, spirotetramat, spirobudifen, spiropidion.

TThe mitochondrial electron transport complex II inhibitor insecticide b16 is selected from cyetpyrafen, cyenopyrafen, cyflumetofen, pyflubumide.

The ichthyidine receptor modulator insecticide b17 is selected from chlorantraniliprole, flubendiamide, cyantraniliprole, cyclaniliprole, tetrachlorantraniliprole, tetraniliprole.

The GABA-gated chloride channel variant modulator insecticide b18 is selected from broflanilide, fluxametamide, cyproflanilide and/or, other insecticide b19 is selected from pymetrozine, indoxacarb, metaflumizone, chlorfenapyr, diafenthiuron, afidopyropen, allosamidin, closantel, copper naphthenate, crotamiton, dixanthogen, fenozaflor, fenoxacrim, flometoquin, flupyradifurone, hydramethylnon, 4-[(sec-butylidene-hydrazono)-(4-chlorophenyl)-methyl]-phenyl methane sulfonate, malonoben, nifluridide, acetofenate, pyridaben, pyridalyl, pyrifluquinazon, rafoxanide, thuringiensin, triarathene, triazamate, bromoacetamide, copper sulfate, ferric phosphate, metaldehyde, niclosamide, sodium pentachlorophenol, tralopyril, tbto, trifenmorph, dinoprop, dinosam, DNOC, metoxadiazone, dialifos, phosmet, flufenerim, pyrimidifen, chlorfenapyr, sanguinarine, spirotetramat, spiromesifen, thiapronil, tazimcarb, chloromethiuron, triflumezopyrim, flucofuron, sulcofuron, maltodextrin, boric acid, diatomaceous earth, silica gel, triphenyltin hydroxide, borax, lime sulfur, copper oleate, mercurous chloride, potassium thiocyanate or sodium thiocyanate; chlordane, endosulfan, ethiprole, fipronil, pleocidin, spinetoram, pymetrozine, pyrifluquinazon, afidopyropen, amitraz, flonicamid, acynonapyr, flupentiofenox, isocycloseram, flupyrimin, nicofluprole, cyclobutrifluram, dimpropyridaz, oxazosulfyl, tyclopyrazoflor, spiropidion, benzpyrimoxan, dicloromezotiaz.

The dicarboximide fungicide b21 is selected from procymidone, iprodione, vinclozolin, fluoroimide, myclozolin, chlozolinate, dichlozoline, captafol, captan, folpet, famoxadone, isovaledione, plondrel or thiochlorfenphim The triazole fungicide b22 is selected from epoxiconazole, triadimefon, difenoconazole, diniconazole, myclobutanil, tebuconazole, propiconazole, prothioconazole, metconazole, tetraconazole, triticonazole, azaconazole, bromuconazole, ipconazole, cyproconazole, difenoconazole, active isomer of diniconazole, fenbuconazole, flusilazole, flutriafol, hexaconazole, imibenconazole, penconazole, flusilazole, triadimenol, bitertanol, tricyclazol, fluquinconazole or difenoconazole.

The imidazole fungicide b23 is selected from carbendazim, prochloraz, thiophanate-methyl, thiabendazole, albendazole, fuberidazole, imazalil, active isomer of imazalil, benomyl, triflumizole, cyazofamid, fenamidone, oxpoconazole, pefurazoate, albendazole, chlorfenazole, cypendazole, debacarb, mecarbinzid or rabenzazole.

The oxazole fungicide b24 is selected from famoxadone, pyrisoxazole, hymexazol, oxadixyl, drazoxolon, metazoxolon or oxathiapiprolin.

The thiazole fungicide b25 is selected from ethaboxam, etridiazole, octhilinone, benthiazole, flutianil or thiadifluor.

The morpholine fungicide b26 is selected from aldimorph, benzamorf, dodemorph, fenpropimorph, carbamorph, dimethomorph, flumorph or tridemorph.

The pyrrole fungicide b27 is selected from fenpiclonil or fludioxonil.

The pyridine fungicide b28 is selected from fluazinam, pyrifenox, fenhexamid, boscalid, bixafen, fluopicolide, PEIP, fluopyram, buthiobate, pyridinitril, pyroxychlor or pyroxyfur.

The pyrimidine fungicide b29 is selected from cyprodinil, fluoxastrobin, ferimzone, mepanipyrim, pyrimethanil, fenarimol, nuarimol, bupirimate, dimethirimol, ethirimol, ferimzone or triarimol.

The quinazolinone fungicide b30 is selected from chinomethionate, dithianon, ethoxyquinoline, 8-hydroxyquinoline, proquinazid, quinoxyfen, halacrinate, quinacetol or tebufloquin.

The carbamate fungicide b31 is selected from diethofencarb, iprovalicarb, benthiavalicarb-isopropyl, valiphenal (IRS885), propamocarb, methasulfocarb, pyribencarb, meptyldinocap, iodocarb, picarbutrazox or tolprocarb.

The organophosphorus fungicide b32 is selected from edifenphos, iprobenfos, pyrazophos, tolclofos-methyl, ampropylfos, kitazine, fosetyl, hexylthiofos, inezin, izopamfos, ammonium O,O-diethyl phosphorodithioate, phosdiphen or triamiphos.

The thiocarbamate fungicide b33 is selected from mancozeb, maneb, zineb, propineb, amobam, thiram, ziram, azithiram, carbamorph, ferbam, nabam, tecoram, etem, milneb, metiram or polycarbamate.

The plant growth regulator b34 is selected from acibenzolar, acetylsalicylic acid, chitosan, clofibric acid, triiodobenzoic acid, 4-CPA, 2,4-dichlorophenoxyacetic acid, 2,4-dichlorophenoxybutyric acid, 2,4-dep, 2-(2,4-dichlorophenoxy)propanoic acid, fenoprop, indoleacetic acid, indolebutyric acid, naphthylacetamide, naphthaleneacetic acid, 1-naphthol, naphthoxyacetic acids, potassium naphthenate, sodium naphthenate, (2,4,5-trichlorophenoxy) acetic acid, cytokinin, calcium cyanamide, dimethipin, endothal, ethrel, merphos, pesticides, thidiazuron, tribufos, aviglycine, 1-methylcyclopropene, ACC, etacelasil, glyoxime, fenridazon, Maleic Hydrazide, gibberellins, gibberellic acid, abscisic acid, ancymidol, butralin, chlorphonium, chlorpropham, dikegulac, fluoridamid, flumetralin, fosamine, glyphosine, isopyrimol, jasmonic acid, mepiquat, piproctanly, prohydrojasmon, propham, dimethyl morpholinium chloride, chlorfluoren, chlorflurenol, dichlorflurenol, flurenol-butyl, chlormequat daminozide, flurprimidol, mefluidide, paclobutrazol, tetcyclacis, uniconazole, brassinolide, brassinolide-ethyl, DCPTA, forchlorfenuron, psoralen, pyripropanol, triacontanol, bachmedesh, benzofluor, buminafos, carvone, choline chloride, ciobutide, clofencet, cloxyfonac, cyanamide, cyclanilide, cicloheximide, cyprosulfamide, epocholeone, ethychlozate, ethylene, fuphenthiourea, furalane, heptopargil, holosulf, inabenfide, karetazan, methasulfocarb, prohexadione, pydanon, sintofen, triapenthenol, trinexapac-ethyl, bucarpolate, synergistic phosphorus, O,O-Dimethyl O-phenyl phosphorothioate, octachlorodipropyl ether, piperonyl butoxide, piperonyl cyclonene, piprotal, propylisome, sesamex, sesamolin or sulfoxide.

The copper agent b35 is selected from acypetacs-copper, bordeaux mixture, burgundy mixture, cheshunt mixture, copper acetate, copper carbonate, copper oxychloride, copper silicate, basic copper sulfate, copper zinc chromate, cufraneb, cuprobam, cuprous oxide, mancopper or oxine-copper.

The mercury fungicide b36 is selected from mercuric chloride, mercuric oxide, mercuric bromide, ethylmercury acetate chloride, ethylmercury bromide, ethylmercury chloride, ethylmercury 2,3-dihydroxypropyl keystone alcohol salt, ethylmercury phosphate, ethylmercury sulfonamide, 2,3,7-triphenyltetrazolium chloride, methylmercury benzoate, methylmercury dicyandiamide, methylmercuric pentachlorophenate, 8-phenylmercurioxyquinoline, phenylmercuriurea, phenylmercury acetate, phenylmercury chloride, phenylmercury derivative of pyrocatechol, phenylmercury nitrate, phenethyl salicylate or tolylmercury acetate.

The nematicide b37 is selected from benclothiaz, bromomethane, iodomethane, metham-sodium, methyl isothiocyanate, dazomet, dichloroisopropyl ether, fosthiazate, cadusafos, fensulfothion, thionazin, fenamiphos, ethoprophos, dichlofenthion, isozofos, fosthietan, oxamyl, aldicarb, carbofuran, sulfuryl fluoride, dichloropropene, fluensulfone, 2-furaldehyde, tioxazafen or xylenols.

The bactericidal agent b38 is selected from blasticidin S, kasugamycin, myxothiazol, polyoxin, piomycin, pseudomycin, PSF-D, validacin, validamycin, streptomycin, seedy ax, bismerthiazol, bronopol, cellocidin, chloramphenicol, copper hydroxide, guaiacol, dichlorophen, dipyrithione, dodicin, ethylicin, fenaminosulf, formaldehyde, hexachlorophenol, hydrargaphen, 8-hydroxyquinoline, nitrapyrin, octhilinone, quinolone, oxytetracycline, phenazine, probenazole, benzoic acid,2-(1,3-dithiolan-2-ylidene)hydrazide, thiosen copper, tecloftalam, thiediazole copper, thiomersal, N-octyl-N'-[2-(octylamino)ethyl]ethyl enediamine or Zinc thiazole.

and/or, other fungicide b39 is selected from isoprothiolane, pentachloronitrobenzene, phosethyl-Al, sulfur, copper oxychloride, cuprous oxide, activated ester, metrafenone, bethoxazin, diclomezine, fenpropidin, tetrachlorophthalide, spiroxamine, triforine, GY-81, NKI-42650, dichloran, amisulbrom, zopfiellin, phenamacril, acypetacs, allyl alcohol, bromothalonil, dehydroacetic acid, diethyl pyrocarbonate, fenitropane, hexachlorobutadiene, nitrostyrene, nitrothal-isopropyl, OCH, pentachlorophenyl laurate, o-phenylphenol, piperalin, propamidine, pyroquilon standard, sodium orthophenylphenoxide, sultropen, thicyofen, acypetacs-zinc, polyoxorim-zinc, zinc naphthenate, zinc trichlorophenoxide, ametoctradin, fluotrimazole, cyproconazole, butrizol, anilazine, prothiocarb, chlorquinox, chloranil, dichlone, fenpyrazamine, barium polysulfide, potassium polysulfide, sodium polysulfide, decafentin, potassium azide, sodium azide, benzamacril, phenamacril, bithionol, diphenylamine, felodipine, berberine, osthole, santonin, bentaluron, chlobenthiazone, furophanate, thiophanate, pyriofenone, asomate, urbacid, biphenyl, chlorodinitronaphthalenes, chloroanisole, butyrophenone,2'-hydroxy-, hexachlorobenzene, tecnazene, trichlorotrinitrobenzenes, 2-aminobutane, bingqingxiao, dufulin, ribavirin, tolylfluanid, dodine, guazatine, iminoctadine, cymoxanil or pencycuron.

In some embodiments of the present invention, said active component a is selected from the compounds as shown in the structure of:

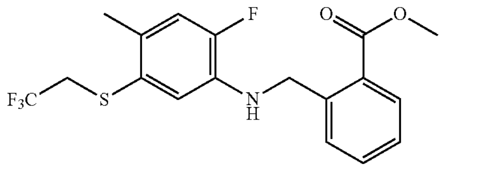
I-53

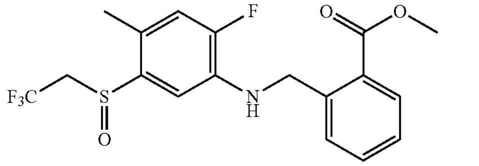
I-54

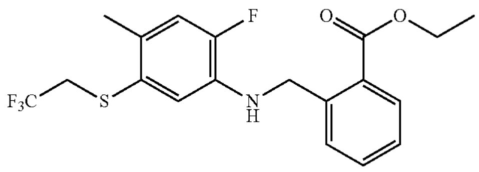
I-55

-continued

I-57

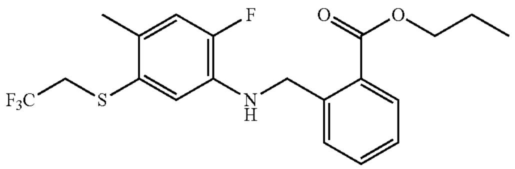

I-69

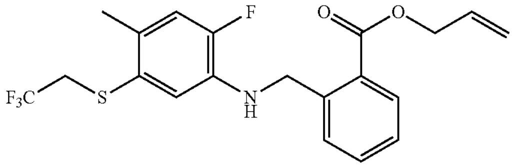

I-71

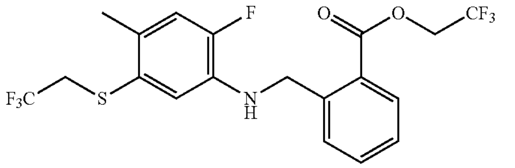

I-303

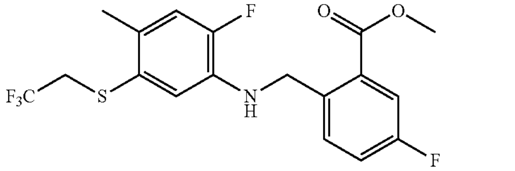

I-305

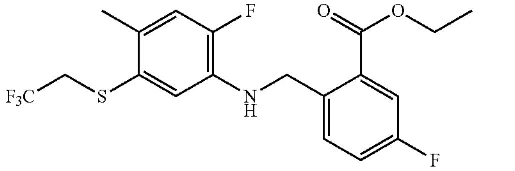

I-1202

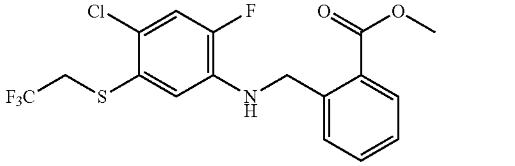

I-1204

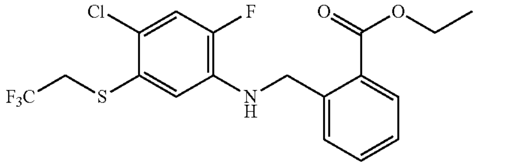

I-1206

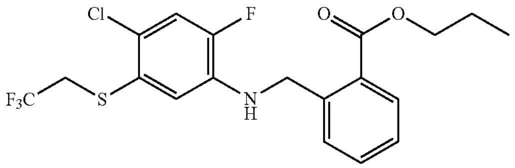

-continued

I-1218

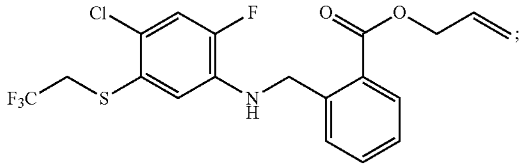

and/or, the active component b is selected from profenofos, triazophos, malathion, phoxim, chlorpyrifos, ethiprole, fipronil, chlorfenapyr, bifenthrin, fenpropathrin, cyfluthrin, beta-cyfluthrin, imidacloprid, acetamiprid, thiamethoxam, clothianidin, dinotefuran, nitenpyram, flupyradifurone, sulfoxaflor, triflumezopyrim, avermectin, emamectin, pyriproxyfen, pymetrozine, afidopyropen, diafenthiuron, azocyclotin, spirotetramat, tolfenpyrad, rotenone, indoxacarb, chlorantraniliprole, flubendiamide, cyantraniliprole, cyclaniliprole, tetrachlorantraniliprole, tetraniliprole, tetrazolamide, flonicamid, broflanilide, fluxametamide, isocycloseram, cyproflanilide.

According to some embodiments of the present invention, said active component a is selected from the compounds as shown in the structure of:

I-53

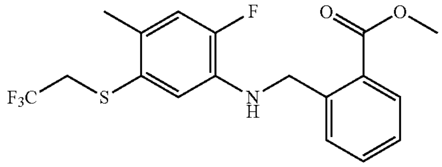

I-54

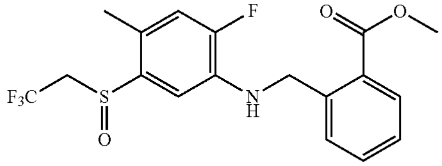

I-55

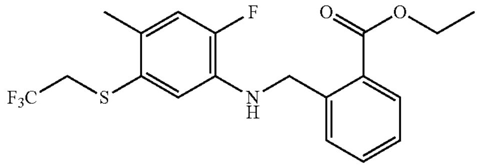

I-57

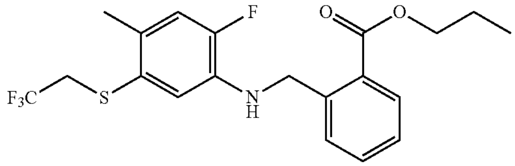

I-69

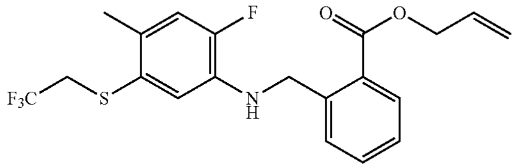

-continued

I-71

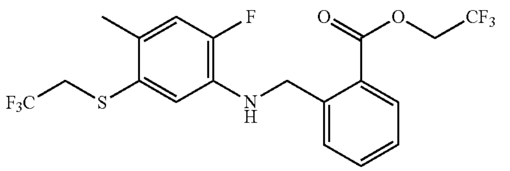

I-303

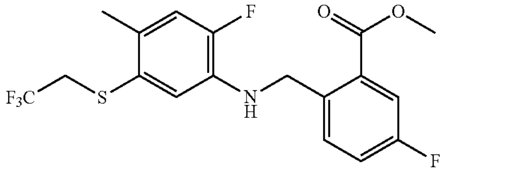

I-305

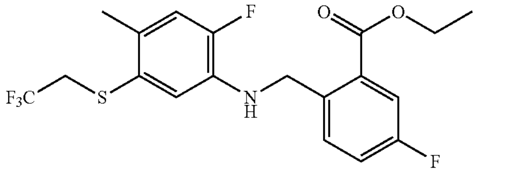

I-1202

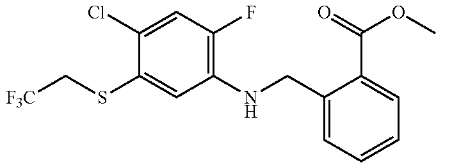

I-1204

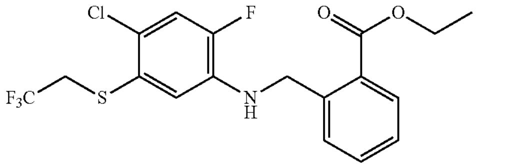

I-1206

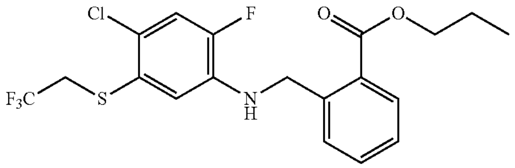

I-1218

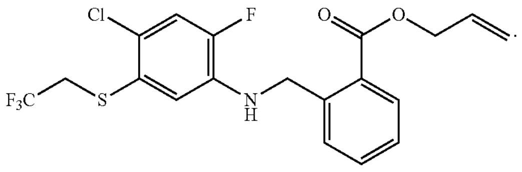

According to some embodiments of the present invention, the active component b is selected from clofentezine, flufenzine, hexythiazox, etoxazole, propargite, spirodiclofen, spiromesifen, spiropidion, pyridaben, bifenazate, tebufenpyrad, cyenopyrafen, cyetpyrafen, cyflumetofen, acynonapyr, flupentiofenox.

According to some embodiments of the present invention, said active component a is selected from the compounds as shown in the structure of:

I-53

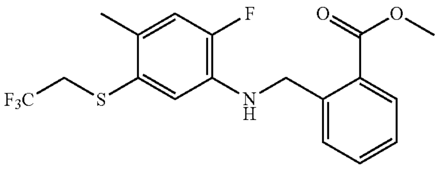

I-54

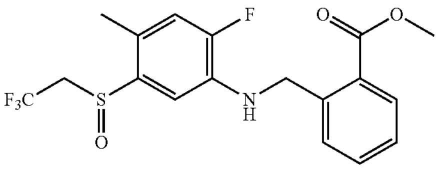

I-55

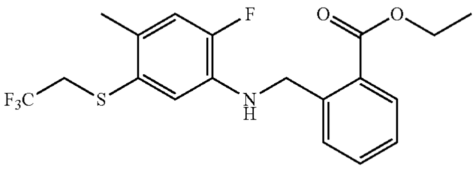

I-57

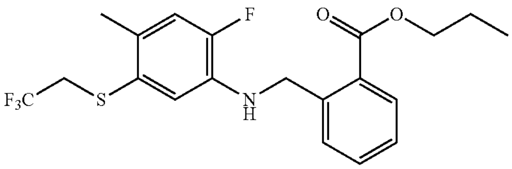

I-69

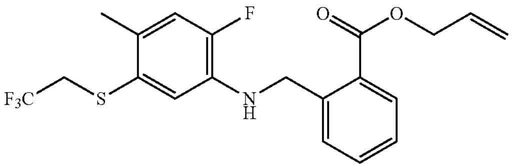

I-71

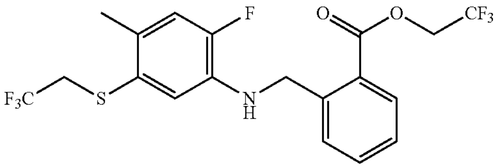

I-303

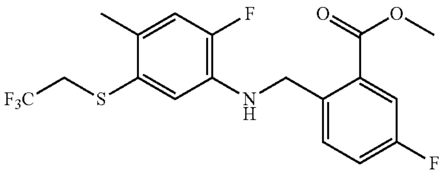

I-305

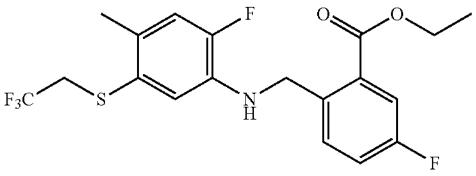

-continued

I-1202

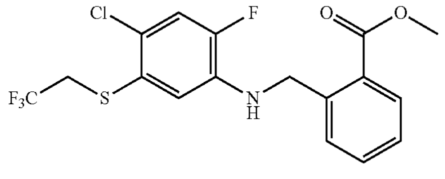

I-1204

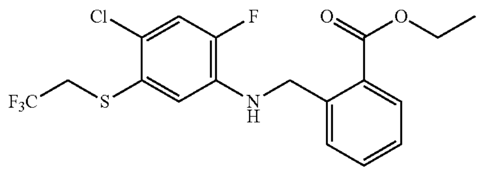

I-1206

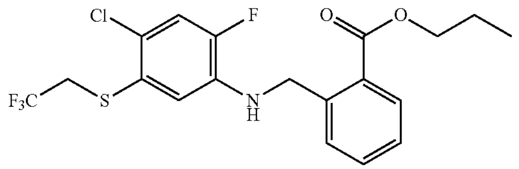

I-1218

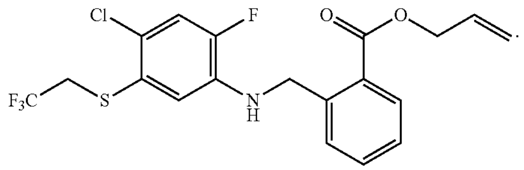

According to some embodiments of the present invention, the active component b is selected frompropiconazole, epoxiconazole, tebuconazole, prothioconazole, difenoconazole, hexaconazole, penconazole, flutriafol, triadimefon, flusilazole, carbendazim, prochloraz, cyazofamid, pyrisoxazole, dimethomorph, flumorph, fludioxonil, fluazinam, boscalid, ethirimol, diethofencarb, mancozeb, thiram, metalaxyl, metiram, bordeaux mixture, Zinc thiazole, thiazolone, mefentrifluconazole, fluopyram, fluxapyroxad, thifluzamide, pydiflumetofen, fluopicolide, azoxystrobin, kresoxim-methyl, pyraclostrobine, picoxystrobin, trifloxystrobin.

The composition provided by the present invention has the advantages of increased effectiveness and expanded control spectrum. The composition provided by the present invention is suitable for controlling a variety of important agricultural and forestry pests, storage pests, urban sanitation pests, including *Panonychus citri* Mc Gregor, *Eotetranychus kankitus* Ehara, Phyllocoptruta *oleivora* Ashmead, Eriophyes *sheldoni* Ewing, *Tetranychus* viennens Zacher, *Tetranychus cinnabarinus* Boi, *Tetranychus urticae* Koch, *Panonychus ulmi* Koch, *Tetranychus truncatus* Ehara, *Petrobia latens* Muller, *Oligonychus ununguis* Jacobi, Breuipalpus oboyats Donnadieu, Tegolophus zizyphagus Keifer, *Holotrichia parallela* Motschulsky, *Holotrichia diomphalia* Bates, Anomalacor pulenta Motschulsky, *Anomala exoleta* Fald, *Gryllotalpa orientalis* Burmeister, *Gryllotalpa unispina* Saussure, *Gryllotalpa unispina* Saussure, *Agrotis ypsilon* Rottemberg, *Agrotis segetum* Denis et Schiffermüller, *Agrotis tokionis* Butler, Pleonomus *canaliculatus*, Agriotes subrittatus Motschulsky, *Teleogryllus emma, Teleogryllus mitratus, Teleogryllus infernalis* Saussure, *Sympiezomias velatus* Chevrolat, Stibaropus *formosanus* Takado et Yamagihara, *Opatrum* subaratum Faldermann, *Gonocephalum reticulatum, Bradysia odoriphaga* Yang et Zhang, *Delia platura, Mamestra brassicae, Delia antigua* Meigen, *Hylemyia* pilip Ygayilleneu, *Stenchaetothrips biformis* Bagnall, *Thrips alliorum* Priesner, *Anaphothrips striatus* Osborn, *Echinocnemus* squamous Billberg, *Lissorhoptrus oryzophilus, Scirpophaga incertulas, Sesamia inferens, Chilo sacchariphagus, Zelkova serrata*, Oulema *oryzae*, Donacia *provosti* Fairmaire, *Lissorhoptrus oryzophilus*, Pachnephorus lewisii Baly, Epicauta gorhami Marseul, Psylliodes *attenuata* Koch, *Cnaphalocrocis medinalis* Guenee, *Parnara guttata* Bremeret Grey, *Nilaparvata lugens* Stal, *Sogatella furcifera* Horvath, *Laodelphax striatellus* Fallen, *Nephotettix cincticeps, Oxya chinensis*, Orseoia *oryzae*, Scotinophara *lurida, Naranga aenescens* Moore, *Nephotettix bipunctatus, Thaia rubiginosa* kuoh, *Cicadella viridis, Erythroneura apicalis* Nawa, *Singapora shinshana, Nephotettix cincticeps, Empoasca biguttula*, Inazuma *dorsalis, Lycorma delicatula, Cryptotympana atrata Fabricius, Chironomus oryzae* Matsumura, *Chlorops oryzae, Hydrellia chinensis* Qi et Li, *Ephydra* macellarfa Egger, *Sitobion avenae*, Schizaphisgraminum, *Rhopalosiphum padi, Rhopalosiphum maidis, Acarus, Mythimna separata, Sitodiplosis mosellana, Homoeosoma nebulella* Hubner, *Mampava bipunctella* Ragonat, *Meromyza saltatrix Linnaeus, Dolerus tritici* Chu, *Locusta migratoria manilensis, Locusta migratoria* L, *Locusta migratoria tibetensis* Chen, *Oxya intricata, Haplotropis brunneriana* Saussure, *Epacromius coerulipes, Shirakiacris shirakii, Calliptamus abbreviatus* Ikonnikov, *Pararcyptera microptera meridionalis, Oedaleus decorus asiaticus, Oedaleus infernalis* Saussure, *Acrida cinerea, Atractomorpha sinensis* Bolvar, *Aiolopus tamulus, Myrmeleotettix Palpalis, Bryodema luctuosum, Ostrinia nubilalis, Chaetocnema hortensis* Geoff, Proceras venosatus, *Longiunguis sacchari*, Dryocosmus kuriphilus Yasumatsu, *Agrius convolvuli, Brachmia macroscopa* Meyrick, *Loxostege* stieticatis *Linnaeus, Chilo infuscatellus*, Cylas *formicarius*, Potato tuberworm, *Leguminivora glycinivorella, Maruca* testulalis Geyer, *Etiella* zinckenezla, *Melanagromyza sojae, Clanis bilineata* tingtauica, *Ophiomyia* shibatsuli Kato, *Bradybaena ravida ravida, Bradybaena similaris, Agriolimax agrestis Linnaeus, Aphis gossypii* Glover, *Tetranychus cinnabarinus* Boi, *Apolygus* lucorpm, *Adelphocoris suturalis* Jakovlev, *Adelphocoris lineolatus* Goeze, Adetphocoris fasciatico Uis Reuter, Dolycoris *baccarum*, Halyomorpha *halys, Stephanitis nashi* Esaki et Takeya, *Pectinophora gossypiella*, Sylepta *derogata Fabricius, Locastra muscosalis, Helicoverpa armigera* Hubner, *Anomis flava*, Sylepta *derogata Fabricius, Empoasca biguttula, Thrips flavus* Schrank, *Earias fabia, Earias cupreoviridis* Walker, *Earias insulana* Boisd, *Myzus persicae, Lipaphis erysimi, Brevicoryne brassicae, Aphis glycines* Matsumura, *Aphis craccivora* Koch, *Acyrthosiphon pisum, Uroleucon formosanum Takahashi, Pieris rapae, Colias erate, Papilio xuthus, Papilio polytes*, Diamondback moth, *Spodoptera exigua* Hiibner, *Spodoptera* litura *Fabricius, Mamestra brassicae Linnaeus*, Argyrogramma agnata, Ilattia octo, Hellula undalis *Fabricius*, Phyllotreta striolata, Henosepilachna vigintioctopunctata, Epilachna vigintioctopunctata, Aulacophora femoralis chinensis Weise, wheat sawfly, Liriomyza sativae Blanchard, Liriomyza bryoniae, Liriomyza huidobrensis Blanchard, American serpentineleafminer, Manduca sexta, Pear leaf blistermoth, Lithocolletis ringoniella Mats, Lyonetia clerkella L., Acrocercops astanrola, Rhynchites foveipennis Fairm, Aulacophora indica, Bemisia tabaci, Trialeurodes vaporariorum, Polyphagotarsonemus *latus*, daikon leaf beetle, *Thrips* palmi Karny, Glyphodes indica Saunders, Saccharosydne procerus, Clania variegata Snellen, Cnidocampa flavescens, Latoia consocia Walker, Porthesia similis, Hyphantria cunea, Spilarctia subcarnea, Phalera flavescens, Ascotis selenaria, Culcula panterinaria Bremer et Grey, Chihuo zao Yang, Percnia giraffata Guenee, Neomargar-odes gossypii Yang, Drosicha corpulenta, Parthenolecaniumcorni, Eulecanium kuwanai kanda, Ceroplastes japonicus Green, Pseudococcus comstocki Kuwana, *Phenacoccus pergandii* Cockerell, *Eriococcus* sp, Acanthococcus kaki Kuwana, Nipaecoccus vastalor, Pseudococcus maritimus, Lopholeucaspis japonica, Pseudaulacaspis pentagona, Lepidosaphes ulmi, Unaspis yanonensis, Parlatoria Pergandii Comstock, Aulacaspis rosae, Pseudaulacaspis pentagona, Unaspis yanonensis Kuwana, Icerya purchasi Maskell, Didesmococcus koreanus Borchsenius, Anoplophora chinensis, Marumba gaschkewitschii Bremer et Grey, Apriona germari, Anoplophora glabripennis, Aromia bungii Faldermann, Batocera horsfieldi, Bacchisa fortunei, Grape tiger longicorn, Thyestilla gebleri Faldermann, Oberea japonica Thunb, Phytoecia rufiventris Gautier, Nola distributa Walker, Seudyra subflava Moore, Ampelophaga *rubiginosa* Bremer et Grey, Paranthrene regalis Butler, Viteus vitifoliae, *Aphis* citricola Van der Goot, Eriosoma lanigerum, Macrosiphum rosirvorum Zhang, Schizaphis piricola, Aphanostigma jakusuiense, Lachnus tropicalis, Tuberculatus margituberculatus, Toxoptera citricidus, Grapholita molesta, Carposina sasakii Matsumura, Janus phi Okanota et Muramatsu, Sinitinea pyrigalla, Cossus cossus *Linnaeus*, Zeuzera coffeae Niether, Conopia hector Butler, Lampra limbata Gebler, Agrilus mali Mats, Grapholitha funebrana Treitscheke, Spilonota albicana Motschulsky, Adoxophyes orana Fisher von Roslerstamm, Acleris fhobriana Thunberg, Adoxophyes cyrtosema, Telphusa chloroderces Meyrieh, Yponomeuta padella *Linnaeus*, Illiberis pruni, Contariasp, Spilonota lechriaspis Meyrick, Carposina sasakii, Dichocrocis punctiferalis Guenée, Psylla Chinesis YangetLi, Aleurocanthus spiniferus, Rhizoglyphus echinopus, Penthaleusmajor, Phyllocnistis citrella Stainton, Bactrocera *dorsalis* Hendel, Diaphorina citri Kuwayama, Conopomorpha sinensis Bradley, Tessaratoma papillosa, Aceria, Aristobia testudo, Chlumetia guttiventris Walker, Cosmopolites sordidus Germar, Heliodinidae, Atrijuglans hetaohei Yang, Alcidodes juglans Chao, Curculio elephas, *Chilo infuscatellus, Chilo infuscatellus*, Tryporyza nivella *Fabricius*, Alissonotµm impressicolle Arrow, Ceratovacuna lanigera, Fulmekiola serratus, Saccharicoccus sacchari, Sitophilus zeamais, Rhizopertha dominica, Trogoderma granarium Everts, Oryzaephilus surinamensis Linne, Sitophilus *oryzae* Linne, Araecetus fasciculatus, Callosobruchus maculatus, Ephestia elutella, Ephestia kuehniella Zeller, Aglossa Dimidita, Aphomia gularisZeller, Pyralis farinalis *Linnaeus*, Cryptolestes pusillus Oliver, Tribolium castaneum Herbst, Tenebroides mauritanicus Linne, Oryzaephilus surinamensis Linne, Ahasverus advena Walterl, Tribolium castaneum Herbst, Cryptolestes turcicus, Cryptolestes ferrugineus, Alphitobius diaperinus Panzer, Tenebrioob scurusFabricius, Tenebrio molitor, Callosobruchus chinensis, Bruchus pisorum, Bruchus rufimanus Boheman, Plodia interpunctella, Sitotroga cerealella, Plodia interpunctella, Ephestia cautella, Liposcelis bostrychophilus Badonnel, Tyrophagus putrescentiae, Carpophilus dim idiatus, Carpophilus hemipterus, Lasioderma serricorne, Stegobium paniceum, Trogoderma variabile, Trogoderma glabrum, Ptinus japonicus Reitter, Gibbium aequinoctiale Boieldieu, Muscadomestica, Dacus *dorsalis*, Sericata, Calliphoridae, Sarcophagidae, Phormia regina, Blattlla germanica, Periplaneta Americana and Blattodea and Periplaneta australasiae, Periplaneta fuliginosa, Periplaneta brunnea, Pyenoscelus surinamensis, Red ant, Monomorium pharaonis, Monomorium floricola, Anopheles, Culex, Aedes.

The composition provided by the present invention can also control plant diseases caused by a variety of fungi, bacteria and nematodes, including wheat stripe rust, wheat leaf rust, wheat stem rust, wheat scab, wheat yellow dwarf, wheat dwarf, soil borne mosaic disease of wheat, stripe mosaic disease of wheat, stripe mosaic disease of wheat, barley smut, loose smut of wheat, wheat stem smut, wheat bunt, wheat powdery mildew, wheat take-all, wheat sheath blight of rice, wheat downy mildew, wheat nematode disease, barley stripe disease, barley web spot disease, wheat snow mold leaf blight disease, wheat helminth root rot leaf spot disease, rice blast disease, rice smut disease, rice sheath blight, rice bacterial leaf blight, rice bacterial streak, rice flax spot, gibberella fujikuroi, rice stem tip nematode disease, rice rot disease, rice stem rot caused by Sclerotinia sclerotiorum, rice stripe blight, leaf blight of corn, leaf spot of corn, corn round spot disease, corn head smut, corn smut, corn bacterial wilt, corn dwarf mosaic disease, corn rough dwarf disease, corn bacterial wilt disease, corn downy mildew disease, corn curvularia leaf spot disease, gray leaf spot of maize, anthrax of maize, maize take-all, sorghum head smut, sorghum loose smut, sorghum hard smut, sorghum long grain smut, sorghum anthrax, penicillium wilt disease of sorghum, sorghum black bundle disease, sorghum top rot disease, sorghum flower smut disease, millet white hair disease, millet smut disease, millet red leaf disease, sweet potato black spot disease, garlic seedling root rot disease, garlic seedling Meloidogyne incognita disease, sweet potato virus disease, sweet potato storage disease, potato virus disease, potato ring rot disease, potato late blight, potato early blight, potato cancer disease, soybean leaf blight, soybean top blight, soybean sclerotinia disease, soybean root rot, soybean cyst nematode, soybean grey spot, soybean downy mildew, soybean bacterial blight, soybean bacterial spot, soybean purple spot, soybean brown streak, soybean rust, peanut meloidogyne incognita disease, peanut stem rot, peanut black spot, peanut brown spot, peanut net spot, peanut rust, peanut virus disease, cotton fusarium wilt, cotton verticillium wilt, cotton seedling disease, cotton corner spot, cotton boll disease, flax rust, flax wilt, tobacco black shank, tobacco anthrax, tobacco brown spot, tobacco virus disease, tobacco Meloidogyne incognita disease, beet brown spot, beet powdery mildew, beet root rot, beet clump root disease, pear scab, pear rust, pear ring rot, pear black spot, pear brown rot, pear blight, apple tree rot, apple rust, apple deciduous diseases, apple rust fruit disease, apple mosaic disease, apple virus disease, apple orchard spot root rot, apple root rot, apple purple stripe feather disease, apple white stripe feather disease, apple anthrax, apple ring rot, apple penicillium, apple heart rot, apple tiger skin, apple bitter spot disease, apple spot disease, apple rot disease, apple mold disease, grape white rot disease, grape black spot disease, grape downy mildew, grape anthrax, grape brown spot, grape cob brown blight, grape grey mold, jujube witches' broom, jujube rust, jujube shrinkage disease, fruit tree root cancer disease, seedling disease of solanaceae vegetables, tomato virus disease, tomato leaf mold disease, tomato canker disease, tomato wilt, tomato verticillium wilt, tomato early blight, tomato spot blight, tomato leaf mold, tomato gray mold, tomato powdery mildew, eggplant brown streak, eggplant cotton blight, pepper anthrax, pepper blight, pepper scab, cucumber downy mildew, melon anthrax, melon fusarium wilt, melon powdery mildew, melon virus disease, melon grey mold, cucumber scab, cucumber blight, cucumber sclerotinia disease, cucumber bacterial corner spot, brassicaceae virus disease, brassicaceae soft rot disease, brassicaceae downy mildew, brassicaceae black spot, cruciferae swollen root, brassicaceae sclerotinia, brassicaceae black rot, peanut leaf spot, strawberry powdery mildew, banana leaf spot, banana wilt, banana bunchy top disease, banana tea heart rot, banana anthrax, banana black spot disease, rape sclerotinia disease, rape downy mildew, rape atrophy, sesame blight, sesame stem spot blight, sunflower sclerotinia, sunflower black spot, peach, apricot and plum brown rot, peach root cancer, peach anthrax, peach perforation, peach leaf shrink, peach tree rot, peach and apricot scab, peach gummosis, persimmon corner spot, persimmon round spot, persimmon anthrax, strawberry gray mold, chestnut blight, walnut black spot, walnut anthrax, hawthorn blossom rot, kiwifruit canker, bean bacterial blight, bean rust, bean anthrax, bean wilt, celery spot, celery early blight, onion purple spot, vegetable Meloidogyne incognita disease, ginger blast.

The inventors of the present invention have found that indoor bioactivity assays have shown that the insecticidal, acaricidal or fungicidal composition of the present invention is synergistic.

Thus, a second aspect of the present invention provides an use of the composition described in the first aspect in control of pests (especially mite) or diseases. Said pests and diseases are as previously described.

According to some embodiments of the present invention, said composition is used in the control of pests, mites or diseases by applying directly or indirectly at an effective dose of 10 g to 5000 g per hectare to the insect, mite or fungus to be controlled or to the medium in which it grows.

In the present invention, there is no particular limitation on the direct or indirect route, as long as the purpose of controlling pests, mites or diseases can be achieved, for example, the direct route may include directly contacting the composition of the present invention with pests, mites or bacteria; the indirect route may include treating the place where pests, mites or bacteria grow or haunt, or treating the food chain by the composition of the present invention.

The composition of the present invention can be provided in the form of finished formulation. For example, it can be made into emulsifiable concentrate, suspension concentrate, water dispersible granule, water emulsion, microemulsion, soluble liquid, wettable powder, oil suspension, etc., as desired.

The cumulative weight percent of active component a and b in the composition of the present invention ranges from 0.5% to 95%, preferably from 1% to 85% cumulative.

The content of active component in the composition of the present invention depends on the amount applied when used alone, but also on the mixing ratio and the degree of synergistic effect. The optimal range of the content of active component can vary depending on the type of formulation of the composition.

The preparation of the formulation of the composition of the present invention can be prepared by conventional processing methods, such as mixing the active component with a liquid carrier (solvent) or a solid carrier and adding one or several additive (e.g. emulsifier, dispersant, wetting agent, binder, stabilizer and defoamer, etc.). Preferably, in the present invention, said composition contains at least one carrier and at least one surfactant. Preferably, in each of the aforementioned cases, it should be ensured that the active component in the composition of the present invention can be uniformly distributed.

In the present invention, based on weight percentage, the emulsifiable concentrate typically contains 10-75% active component, 2-20% emulsifier, 0-20% other additive (e.g. stabilizer, penetrant, corrosion inhibitor etc.), and solvent, and co-solvent if necessary.

In the present invention, based on weight percentage, the suspension concentrate usually needs to be sanded to obtain a stable non-deposited flowable product. The suspension concentrate typically contains 5-50% active component, 5-15% dispersant, 0.1-10% wetting agent, 4-10% antifreeze, 0-10% other additive (e.g. defoamer, preservative, stabilizer, penetrant and thickener) and a balance of liquid carrier.

In the present invention, based on weight percentage, the water dispersible granule is typically made into 10-100 international standard sieve (1.676-0.152 mm) particles, which can be prepared by extrusion, impregnation or spray granulation methods. Typically, the water dispersible granule contains 0.5-80% active component and 5-20% additive (e.g. dispersant, wetting agent, disintegrant and binder) and a balance of inert carrier.

In the present invention, based on weight percentage, the wettable powder typically contains 10-85% active component, usually 3-10% dispersant in addition to a solid inert carrier, and may contain 0-10% wetting agent and/or other additive (e.g., penetrant or stabilizer).

In the present invention, the water emulsion is formed by mixing original drug, organic solvent and surfactant to form the oil phase; mixing the water and antifreeze together to form a homogeneous transparent water phase. The oil phase is sheared at high speed with a high-shear emulsifier, while the water phase is slowly added to the oil phase. In terms of weight percentage, the water emulsion usually contains 1-60% active component, 5-20% surfactant, 2-10% antifreeze, and a balance of water.

In the present invention, the microemulsion is a mixture of the original drug, organic solvent, emulsifier and water and is a homogeneous transparent liquid. In terms of weight percentage, the microemulsion usually contains 1-50% active component, 10-40% emulsifier, 40-60% organic solvent, and a balance of water.

In the present invention, the soluble liquid is a mixture of active component, organic solvent and surfactant and is a homogeneous transparent liquid. In terms of weight percentage, the soluble liquid agent usually has 1-50% active component, 6-20% surfactant, and a balance of organic solvent.

In the present invention, the oil suspension is made by adding the active component, surfactant, and oil-based carrier to a sand mill and sanding until the particle size is qualified. In terms of weight percentage, the oil suspension agent usually contains 2-60% active component, 6-20% surfactant, and a balance of oil-based carrier.

In the present invention, water-containing dispersion and emulsion (e.g. composition obtained by diluting the emulsifiable concentrate, wettable powder or concentrate of the present invention with water) are also within the scope of the present invention. The aforementioned emulsion (including all the aforementioned forms) may be of the water-in-oil type or the oil-in-water type and may have a thick, slurry consistency.

The formulation of the composition of the present invention can be formulated using (liquid or solid) carrier and various additives that are well known to those skilled in the art. Examples include, but are not limited to, the following types of substances:

Suitable liquid carrier or solvent can be one or more of water, various kind of aromatic hydrocarbon, aliphatic hydrocarbon, ketone, ether etc., such as toluene, xylene, acetone, cyclohexanone, xylene, benzene, cyclohexane, isopropanol, ethylene glycol, sorbitol, methanol, ethanol, butanol, dimethyl formamide, naphthane, motor oil, petroleum ether, cyclohexanone, methyl oleate, methylated soybean oil, etc.

Suitable solid carrier includes natural or synthetic clay and silicate. Suitable solid carrier for powder includes naturally occurring rock powder, chalk, quartz, clay, montmorillonite, white carbon black, diatomaceous earth, pumice, gypsum, talc, bentonite, kaolin, argil and synthetic ground mineral (e.g., microdispersed silicic acid or alumina). Suitable particle carrier includes crushed and graded natural rock such as calcite, marble, pumice, seafoam and dolomite and synthetic particle made from powder of organic and inorganic substance.

Suitable co-solvent may be one or more of methanol, phenol, isopentanol, dimethyl sulfoxide, ethyl acetate, butanone, dimethyl formamide, tetradecanol, etc.

Suitable emulsifier may be one or more of ethoxylated castor oil, polyoxyethylene(n20) phenethyl phenol ether oleate, alkyl aryl polyoxyethylene polyoxypropylene ether, alkyl aryl formaldehyde resin polyoxyethylene ether, diphenylphenolyl polyoxyethylene (n18) ether formaldehyde condensate, sodium dodecyl sulfate, pesticide emulsifier 0201B, pesticide emulsifier 0203B, pesticide emulsifier T-20, pesticide emulsifier S-80, pesticide emulsifier 507#, pesticide emulsifier 100#, pesticide emulsifier 36#, pesticide emulsifier 600#, pesticide emulsifier 1601#, pesticide emulsifier 2201#, pesticide emulsifier 700#, pesticide emulsifier NP-7, pesticide emulsifier NP-15, etc.

Suitable dispersants may be one or more of sodium lignosulfonate, calcium lignosulfonate, formaldehyde condensate of methyl naphthalene sulfonate, formaldehyde condensate of sodium methyl naphthalene sulfonate, sodium methylene naphthalene sulfonate, sodium N-methyl-N-oleoylaminoethylsalfonate, epoxy polyether, p-tert-butyl ether, piperonyl butyl ether, alkyl amido taurine salt, formaldehyde condensate of dibutyl naphthalene sulfonate, alkylphenol polyoxyvinyl phosphate, methyl cellulose, sodium salt of formaldehyde condensate of naphthol sulfonic acid, etc.

Suitable wetting agent may be one or more of sodium sulfate, sodium lauryl sulfate, sodium methylene naphthalene sulfonate, sodium dodecyl benzene sulfonate, calcium dodecyl benzene sulfonate, sodium alkyl naphthalene sulfonate aliphatic alcohol polyoxyethylene ether, alkylphenol polyoxyethylene ether, etc.

Suitable thickener may be synthetic (e.g., carbomyl alcohol, polyvinyl alcohol, polyvinyl acetate) or natural water-soluble polymer (e.g., xanthan gum, gelatin, gum arabic, polyvinylpyrrolidone, magnesium aluminum silicate, polyvinyl alcohol, polyethylene glycol, phenolic resin, shellac, carboxymethyl cellulose, and sodium alginate) incorporated into the formulation in powder, granule, or latex form.

Suitable defoamer may be polyether defoamer (paodi), silicone, C8-10 fatty alcohol, phosphate ester, C10-20 saturated fatty acid (such as capric acid) and amide, etc.

Suitable oxidizing agent may be potassium chlorate, sodium chlorate, potassium perchlorate, sodium nitrate, potassium nitrate, potassium permanganate, etc.

Suitable binder may be polyvinyl alcohol, polyvinyl acetate, xanthan gum, gelatin, carboxymethyl cellulose, soluble starch, polyethylene glycol 8000 and sodium alginate.

In the present invention, in order to control urban pests, preferably, an aerosol can be made in which a propellant needs to be added, or a bait composition can be made in which one or more food material suitable for insect feeding, an optional lure and an optional wetting agent in addition to the active component may be added.

In the present invention, the combination of said active component a with the compound as shown by (b1)-(b19) in said active component b in the composition is suitable for the control of a wide range of important agricultural and forestry pests and mites; the combination of said active component a with the compound listed in (b20)-(b39) in said active component b is suitable for the control of a wide range of harmful bacteria, especially many kinds of fungal disease, bacterial disease, nematode disease, viral disease and many kinds of storage disease of cereal, vegetable, fruit tree, ornamental plant, lawn and tropical crop.

In accordance with a preferred embodiment of the present invention, the present invention provides a composition for use in the control of mite infestation, the composition comprising an active component a and an active component b, wherein said active component a comprises a compound having the structure as shown in formula I-53 and/or formula I-1202; said active component b is selected from clofentezine and/or hexythiazox;

I-53

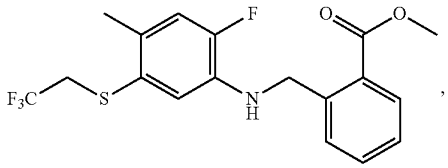

,

I-1202

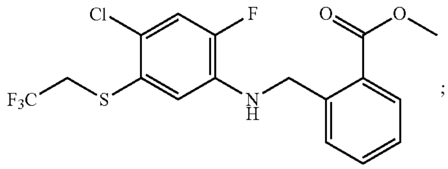

;

wherein the weight ratio of active component a and active component b is 1: (5-30).

In accordance with a preferred embodiment of the present invention, the above composition comprises an active component a and an active component b, wherein said active component a is a compound having the structure as shown in formula I-1202; said active component b is selected from clofentezine;

I-1202

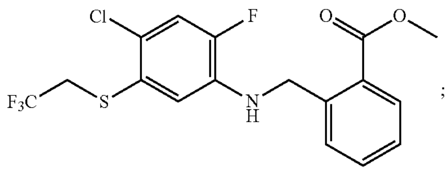

;

wherein the weight ratio of active component a and active component b is 1: (20-30).

The following specific examples are used to illustrate the invention in further detail, but the invention is by no means limited to these examples. The percentages or ratios of the components in the examples are calculated by weight. The active component in each formulation is calculated as the effective content.

In the following embodiments, Compound A1, Compound A2, Compound A3, Compound A4, Compound A5, Compound A6, Compound A7, Compound A8, Compound A9, Compound A10, Compound A11, Compound A12 correspond to compounds I-53, I-54, I-55, I-57, I-69, I-71, I-303, I-305, I-1202, I-1204, I-1206, I-1218 in List I of CN111825585A, respectively.

FORMULATION EXAMPLES

Formulation Example 1

Formulation of Emulsifiable Concentrate with 25% Etoxazole-Compound A5

As required by the formulation and weighted by weight, 5 parts of etoxazole, 20 parts of compound A5, 7 parts of pesticide emulsifier 0201B, 3 parts of pesticide emulsifier NP-15, 2 parts of pesticide emulsifier 700#, 12 parts of dimethylformamide, 51 parts of xylene were mixed and dissolved by heating in a hot water bath if necessary to obtain an emulsifiable concentrate with 25% etoxazole-compound A5.

Formulation Example 2

Formulation of Oil Suspension with 35% Cyflumetofen-Compound A2

As required by the formulation and weighted by weight, 20 parts of cyflumetofen, 15 parts of compound A2, 6 parts of pesticide emulsifier 0201B, 2 parts of pesticide emulsifier 700#, 5 parts of pesticide emulsifier S-80, 10 parts of methyl oleate, 3 parts of white carbon black, 1 part of pesticide emulsifier T-20, 33 parts of methylated soybean oil, were added to the sanding kettle and ground finely to make an oil suspension with 35% cyflumetofen-compound A2.

Formulation Example 3

Formulation of Water Emulsion with 30% Propargite-Compound A3

As required by the formulation and weighted by weight, 20 parts of propargite, 10 parts of compound A3, 8 parts of alkyl aryl polyoxyethylene polyoxypropylene ether, 5 parts of pesticide emulsifier 2201#, 15 parts of dimethylformamide, 0.5 parts of tetradecanol were mixed together and dissolved into a uniform oil phase, and 41.5 parts of water were added under high-speed stirring to form a well-dispersed water emulsion with 30% propargite-compound A3.

Formulation Example 4

Formulation of Water Emulsion with 35% Diafenthiuron-Compound A4

As required by the formulation and weighted by weight, 15 parts of diafenthiuron, 20 parts of compound A4, 8 parts of polyoxyethylene (n20) phenethyl phenol ether oleate, 3 parts of calcium dodecyl benzene sulfonate, 2 parts of pesticide emulsifier 507#, 5 parts of dimethyl formamide, 3 parts of tetradecanol were mixed together and dissolved into a uniform oil phase, and 44 parts of water were added under high-speed stirring to form a well-dispersed water emulsion with 35% diafenthiuron-compound A4.

Formulation Example 5

Formulation of Wettable Powder with 30% Tebufenpyrad-Compound A6

As required by the formula and weighted by weight, 20 parts of tebufenpyrad, 10 parts of compound A6, 2 parts of sodium dodecyl sulfate, 6 parts of sodium salt of formaldehyde condensate of naphthol sulfonic acid, 4 parts of sodium lignin sulfonate, 5 parts of white carbon black, 53 parts of bentonite were mixed thoroughly and crushed by ultra-fine pulverizer to obtain a wettable powder with 30% tebufenpyrad-compound A6.

Formulation Example 6

Formulation of Water Dispersible Granule with 30% Cyenopyrafen-Compound A1

As required by the formulation and weighted by weight, 25 parts of cyenopyrafen, 5 parts of compound A1, 15 parts of formaldehyde condensate of sodium methyl naphthalene sulfonate, 5 parts of sodium alginate, 5 parts of polyethylene glycol 8000, 15 parts of sodium sulfate, 30 parts of bentonite were mixed and crushed, then kneaded with water and added to a granulator equipped with a certain specification screen for granulation. Then it was dried and sieved (according to the sieve range) to obtain a water dispersible granule with 30% cyenopyrafen-compound A1.

Formulation Example 7

Formulation of Microemulsion with 35% Chlorantraniliprole-Compound A4

As required by the formulation and weighted by weight, 30 parts of chlorantraniliprole, 5 parts of compound A4, 10 parts of diphenylphenolyl polyoxyethylene (n18) ether formaldehyde condensate, 10 parts of pesticide emulsifier 2201#, 5 parts of pesticide emulsifier 700#, 15 parts of cyclohexanone were added together and dissolved into a homogeneous oil phase, 25 parts of water were added, and the water phase was added to the oil phase or the oil phase was added to the water phase under high-speed stirring, to form a microemulsion with 35% chlorantraniliprole-compound A4 with good dispersion.

Formulation Example 8

Formulation of Soluble Solution with 40% Avermectin-Compound A1

As required by the formulation and weighted by weight, 35 parts of avermectin, 5 parts of compound A1, 15 parts of pesticide emulsifier 507#, 5 parts of pesticide emulsifier 1601#, 6 parts of pesticide emulsifier 100#, 12 parts of dimethylformamide, 15 parts of dimethyl sulfoxide, 7 parts of methanol, dissolved by heating in a hot water bath if necessary, a soluble solution with 40% avermectin-compound A1 was obtained.

Formulation Example 9

Formulation of a Wettable Powder with 60% Carbendazim-Compound A2

As required by the formulation and weighted by weight, 50 parts of carbendazim, 10 parts of compound A2, 2 parts of sodium dodecyl sulfate, 6 parts of sodium salt of formaldehyde condensate of naphthol sulfonic acid, 4 parts of sodium ligninsulfonate, 5 parts of white carbon black, 33 parts of bentonite, were fully mixed and crushed by ultra-fine pulverizer to obtain a wettable powder with 60% carbendazim-compound A2.

Formulation Example 10

Formulation of Emulsifiable Concentrate with 55% Pyraclostrobine-Compound A3

As required by the formulation and weighted by weight, add 45 parts of pyraclostrobine, 10 parts of compound A3, 7 parts of pesticide emulsifier 0201B, 3 parts of pesticide emulsifier NP-15, 2 parts of pesticide emulsifier 700#, 12 parts of dimethylformamide, 21 parts of xylene were mixed well and dissolve with heat in a hot water bath if necessary, to obtain an emulsifiable concentrate with 55% pyraclostrobine-compound A3.

Formulation Example 11

Formulation of Wettable Powder with 35% Mancozeb-Compound A4

As required by the formulation and weighted by weight, 30 parts of mancozeb, 5 parts of compound A4, 2 parts of sodium dodecyl sulfate, 6 parts of sodium salt of formaldehyde condensate of naphthol sulfonic acid, 4 parts of sodium ligninsulfonate, 5 parts of white carbon black, 48 parts of bentonite were mixed thoroughly and crushed by ultra-fine pulverizer to obtain a wettable powder with 35% mancozeb-compound A4.

Formulation Example 12

Formulation of Wettable Powder with 40% Fluxapyroxad-Compound A1

As required by the formulation and weighted by weight, 35 parts of fluxapyroxad, 5 parts of compound A1, 2 parts of sodium dodecyl sulfate, 6 parts of sodium salt of formaldehyde condensate of naphthol sulfonic acid, 4 parts of sodium ligninsulfonate, 5 parts of white carbon black, 43 parts of bentonite were mixed thoroughly and crushed by ultra-fine pulverizer to obtain a wettable powder with 40% fluxapyroxad-compound A1.

Formulation Example 13

Formulation of Suspension Concentrate with 50% Mefentrifluconazole-Compound A2

As required by the formulation and weighted by weight, 40 parts of mefentrifluconazole, 10 parts of compound A2, 3 parts of sodium lignosulfonate, 5 parts of formaldehyde condensate of sodium naphthalene sulfonate, 2 parts of pesticide emulsifier 1601#, 3 parts of pesticide emulsifier 0201B, 0.1 parts of xanthan gum, 0.2 parts of white carbon black, 5 parts of ethylene glycol, and 31.7 parts of water were added into the sanding kettle and grind finely to make a suspension concentrate with 50% mefentrifluconazole-compound A2.

EXAMPLES

Indoor Bioactivity Assay

Test subject: *Tetranychus cinnabarinus* Boi, adult mite, indoor rearing sensitive strain.

Test condition: 25° C. constant temperature incubator, 60% relative humidity, light L:D=14:10

Test solution formulation: according to the test needs, accurately weigh the test sample more than 50 mg by using an electronic analytical balance, mixed with acetone to the required concentration, according to calculation, the sample of acetone solution added to a volumetric flask, diluted by aqueous solution with 0.1 wt % Tween 80 to obtain the required concentration of the solution.

Test method: One true leaf was removed after cutting the seedlings of beans, and one true leaf was added to the hydroponic glass jar after leaving the leaf to access about 50-150 adult *Tetranychus cinnabarinus* Boi of the same size, and the mite base was counted the next day. The Airbrush method was used to treat the test material with medicinal spray, 1.5 mL of medicinal spray was sprayed for each treatment, and a blank control was set for three treatments.

After spraying and drying naturally, the treated test material was placed in a constant temperature observation room. 72 hours later, the number of live mites was investigated and the mortality rate was calculated. The Bliss method was used for evaluation, and the theoretical mortality rate could be calculated by the following formula:

$$P=P_m+P_n(1-P_m)$$

$P_m$ is the mortality rate (%) of the target at a concentration of m for the first active component (active component a); $P_n$ is the mortality rate (%) of the target at a concentration of n for the second active component (active component b).

In the following examples, if the actual mortality rate of the target after mixing the two active components at a certain concentration is greater than the theoretical mortality rate P, the two active components are judged to have a synergy when mixed at this concentration, and conversely judged to have a an antagonism.

Example 1

Compounds A1 (I-53) and A9 (I-1202) were tested for synergistic effects on adult *Tetranychus cinnabarinus* Boi when mixed with two agents such as spirodiclofen and spiromesifen, and the test results were shown in Table 1.

TABLE 1

| Number | Raw drug or combination | Concentration (mg/L) | 72 h mortality rate (%) | Theoretical mortality rate (%) | Synergy |
|---|---|---|---|---|---|
| 1 | A1 | 0.8 | 74.6 | / | / |
| 2 | | 0.4 | 40.1 | / | / |
| 3 | | 0.2 | 27.9 | / | / |
| 4 | | 0.04 | 0 | / | / |
| 5 | A9 | 0.8 | 62.3 | / | / |
| 6 | | 0.4 | 42.2 | / | / |
| 7 | | 0.2 | 19.8 | / | / |

TABLE 1-continued

| Number | Raw drug or combination | Concentration (mg/L) | 72 h mortality rate (%) | Theoretical mortality rate (%) | Synergy |
|---|---|---|---|---|---|
| 8 | | 0.04 | 0 | / | / |
| 9 | spirodiclofen | 5 | 56.9 | / | / |
| 10 | | 1 | 24.2 | / | / |
| 11 | | 0.4 | 9.4 | / | / |
| 12 | | 0.2 | 0 | / | / |
| 13 | | 0.04 | 0 | / | / |
| 14 | | 0.01 | 0 | / | / |
| 15 | spiromesifen | 5 | 64.9 | / | / |
| 16 | | 1 | 30.4 | / | / |
| 17 | | 0.4 | 14.1 | / | / |
| 18 | | 0.2 | 0 | / | / |
| 19 | | 0.04 | 0 | / | / |
| 20 | | 0.01 | 0 | / | / |
| 21 | A1 + spirodiclofen = 1:125 | 0.04:5 | 66.6 | 56.9 | Synergy |
| 22 | A1 + spirodiclofen = 1:25 | 0.2:5 | 77.6 | 68.9 | Synergy |
| 23 | A1 + spirodiclofen = 1:2.5 | 0.4:1 | 79.0 | 54.6 | Synergy |
| 24 | A1 + spirodiclofen = 1:1 | 0.4:0.4 | 63.0 | 45.7 | Synergy |
| 25 | A1 + spirodiclofen = 2:1 | 0.8:0.4 | 87.6 | 77.0 | Synergy |
| 26 | A1 + spirodiclofen = 4:1 | 0.8:0.2 | 86.3 | 74.6 | Synergy |
| 27 | A1 + spirodiclofen = 20:1 | 0.8:0.04 | 88.8 | 74.6 | Synergy |
| 28 | A1 + spirodiclofen = 80:1 | 0.8:0.01 | 86.7 | 74.6 | Synergy |
| 29 | A1 + spiromesifen = 1:125 | 0.04:5 | 73.7 | 64.9 | Synergy |
| 30 | A1 + spiromesifen = 1:25 | 0.2:5 | 84.3 | 74.7 | Synergy |
| 31 | A1 + spiromesifen = 1:2.5 | 0.4:1 | 66.5 | 58.3 | Synergy |
| 32 | A1 + spiromesifen = 1:1 | 0.4:0.4 | 71.1 | 48.5 | Synergy |
| 33 | A1 + spiromesifen = 2:1 | 0.8:0.4 | 84.4 | 78.2 | Synergy |
| 34 | A1 + spiromesifen = 4:1 | 0.8:0.2 | 88.7 | 74.6 | Synergy |
| 35 | A1 + spiromesifen = 20:1 | 0.8:0.04 | 85.9 | 74.6 | Synergy |
| 36 | A1 + spiromesifen = 80:1 | 0.8:0.01 | 88.0 | 74.6 | Synergy |
| 37 | A9 + spirodiclofen = 1:125 | 0.04:5 | 64.0 | 56.9 | Synergy |
| 38 | A9 + spirodiclofen = 1:25 | 0.2:5 | 72.6 | 65.4 | Synergy |
| 39 | A9 + spirodiclofen = 1:2.5 | 0.4:1 | 74.7 | 56.2 | Synergy |
| 40 | A9 + spirodiclofen = 1:1 | 0.4:0.4 | 62.0 | 47.6 | Synergy |
| 41 | A9 + spirodiclofen = 2:1 | 0.8:0.4 | 85.3 | 65.8 | Synergy |
| 42 | A9 + spirodiclofen = 4:1 | 0.8:0.2 | 86.3 | 62.3 | Synergy |
| 43 | A9 + spirodiclofen = 20:1 | 0.8:0.04 | 84.8 | 62.3 | Synergy |
| 44 | A9 + spirodiclofen = 80:1 | 0.8:0.01 | 82.2 | 62.3 | Synergy |
| 45 | A9 + spiromesifen = 1:125 | 0.04:5 | 76.1 | 64.9 | Synergy |
| 46 | A9 + spiromesifen = 1:25 | 0.2:5 | 83.5 | 71.8 | Synergy |
| 47 | A9 + spiromesifen = 1:2.5 | 0.4:1 | 38.1 | 29.8 | Synergy |
| 48 | A9 + spiromesifen = 1:1 | 0.4:0.4 | 73.5 | 50.3 | Synergy |
| 49 | A9 + spiromesifen = 2:1 | 0.8:0.4 | 78.8 | 67.6 | Synergy |
| 50 | A9 + spiromesifen = 4:1 | 0.8:0.2 | 75.9 | 62.3 | Synergy |
| 51 | A9 + spiromesifen = 20:1 | 0.8:0.04 | 72.5 | 62.3 | Synergy |
| 52 | A9 + spiromesifen = 80:1 | 0.8:0.01 | 76.5 | 62.3 | Synergy |

Example 2

Compounds A1 and A9 were tested for their synergistic effects on adult *Tetranychus cinnabarinus* Boi when mixed with cyetpyrafen. The test results were shown in Table 2.

TABLE 2

| Number | Raw drug or combination | Concentration (mg/L) | 72 h mortality rate (%) | Theoretical mortality rate (%) | Synergy |
|---|---|---|---|---|---|
| 1 | A1 | 0.8 | 74.3 | / | / |
| 2 | | 0.4 | 40.4 | / | / |
| 3 | | 0.2 | 22.2 | / | / |
| 4 | | 0.04 | 0 | / | / |
| 5 | | 0.01 | 0 | / | / |
| 6 | A9 | 0.8 | 64.1 | / | / |
| 7 | | 0.4 | 41.9 | / | / |
| 8 | | 0.2 | 18.5 | / | / |
| 9 | | 0.04 | 0 | / | / |
| 10 | | 0.01 | 0 | / | / |
| 11 | cyetpyrafen | 0.5 | 75.5 | / | / |
| 12 | | 0.2 | 37.9 | / | / |
| 13 | | 0.1 | 17.0 | / | / |
| 14 | | 0.05 | 2.8 | / | / |
| 15 | | 0.01 | 0 | / | / |

TABLE 2-continued

| Number | Raw drug or combination | Concentration (mg/L) | 72 h mortality rate (%) | Theoretical mortality rate (%) | Synergy |
|---|---|---|---|---|---|
| 16 | A1 + cyetpyrafen = 1:50 | 0.01:0.5 | 86.0 | 75.5 | Synergy |
| 17 | A1 + cyetpyrafen = 1:10 | 0.01:0.1 | 40.6 | 17.2 | Synergy |
| 18 | A1 + cyetpyrafen = 1:5 | 0.04:0.2 | 54.9 | 38.0 | Synergy |
| 19 | A1 + cyetpyrafen = 1:1 | 0.2:0.2 | 65.9 | 51.8 | Synergy |
| 20 | A1 + cyetpyrafen = 8:1 | 0.4:0.05 | 61.4 | 42.2 | Synergy |
| 21 | A1 + cyetpyrafen = 4:5 | 0.04:0.05 | 14.8 | 3.0 | Synergy |
| 22 | A1 + cyetpyrafen = 20:1 | 0.2:0.01 | 53.6 | 38.0 | Synergy |
| 23 | A1 + cyetpyrafen = 80:1 | 0.8:0.01 | 80.7 | 74.3 | Synergy |
| 24 | A9 + cyetpyrafen = 1:50 | 0.01:0.5 | 82.3 | 75.5 | Synergy |
| 25 | A9 + cyetpyrafen = 1:10 | 0.01:0.1 | 39.3 | 17.2 | Synergy |
| 26 | A9 + cyetpyrafen = 1:5 | 0.04:0.2 | 48.1 | 38.0 | Synergy |
| 27 | A9 + cyetpyrafen = 1:1 | 0.2:0.2 | 55.4 | 49.5 | Synergy |
| 28 | A9 + cyetpyrafen = 8:1 | 0.4:0.05 | 63.3 | 43.6 | Synergy |
| 29 | A9 + cyetpyrafen = 4:5 | 0.04:0.05 | 27.2 | 3.0 | Synergy |
| 30 | A9 + cyetpyrafen = 20:1 | 0.2:0.01 | 35.8 | 18.5 | Synergy |
| 31 | A9 + cyetpyrafen = 80:1 | 0.8:0.01 | 72.2 | 64.1 | Synergy |

Example 3

Compounds A1 and A9 were tested for their synergistic effects on adult *Tetranychus cinnabarinus* Boi when mixed with propargite. The test results are shown in Table 3.

TABLE 3

| Number | Raw drug or combination | Concentration (mg/L) | 72 h mortality rate (%) | Theoretical mortality rate (%) | Synergy |
|---|---|---|---|---|---|
| 1 | A1 | 0.8 | 72.6 | / | / |
| 2 | | 0.2 | 28.1 | / | / |
| 3 | A9 | 0.8 | 67.1 | / | / |
| 4 | | 0.2 | 27.5 | / | / |
| 5 | propargite | 25 | 34.1 | / | / |
| 6 | | 4 | 3.9 | / | / |
| 7 | | 0.4 | 0 | / | / |
| 8 | | 0.1 | 0 | / | / |
| 9 | A1 + propargite = 1:125 | 0.2:25 | 65.9 | 52.6 | Synergy |
| 10 | A1 + propargite = 1:20 | 0.2:4 | 41.4 | 30.9 | Synergy |
| 11 | A1 + propargite = 1:5 | 0.8:4 | 85.3 | 73.7 | Synergy |
| 12 | A1 + propargite = 2:1 | 0.8:0.4 | 86.6 | 72.6 | Synergy |
| 13 | A1 + propargite = 8:1 | 0.8:0.1 | 84.4 | 72.6 | Synergy |
| 14 | A9 + propargite = 1:125 | 0.2:25 | 67.7 | 52.2 | Synergy |
| 15 | A9 + propargite = 1:20 | 0.2:4 | 45.5 | 30.3 | Synergy |
| 16 | A9 + propargite = 1:5 | 0.8:4 | 82.2 | 68.4 | Synergy |
| 17 | A9 + propargite = 2:1 | 0.8:0.4 | 80.1 | 67.1 | Synergy |
| 18 | A9 + propargite = 8:1 | 0.8:0.1 | 82.5 | 67.1 | Synergy |

Example 4

Compounds A1 and A9 were tested for their synergistic effect on adult *Tetranychus cinnabarinus* Boi when mixed with etoxazole. The test results were shown in Table 4.

TABLE 4

| Number | Raw drug or combination | Concentration (mg/L) | 72 h mortality rate (%) | Theoretical mortality rate (%) | Synergy |
|---|---|---|---|---|---|
| 1 | A1 | 0.8 | 72.7 | / | / |
| 2 | | 0.4 | 43.3 | / | / |
| 3 | | 0.2 | 26.8 | / | / |
| 4 | | 0.04 | 0 | / | / |
| 5 | A9 | 0.8 | 64.6 | / | / |
| 6 | | 0.4 | 36.0 | / | / |
| 7 | | 0.2 | 22.1 | / | / |
| 8 | | 0.04 | 0 | / | / |
| 9 | etoxazole | 5 | 43.6 | / | / |
| 10 | | 1 | 26.6 | / | / |

TABLE 4-continued

| Number | Raw drug or combination | Concentration (mg/L) | 72 h mortality rate (%) | Theoretical mortality rate (%) | Synergy |
|---|---|---|---|---|---|
| 11 | | 0.4 | 21.4 | / | / |
| 12 | | 0.2 | 9.3 | / | / |
| 13 | | 0.04 | 0 | / | / |
| 14 | | 0.01 | 0 | / | / |
| 15 | A1 + etoxazole = 1:125 | 0.04:5 | 50.3 | 43.6 | Synergy |
| 16 | A1 + etoxazole = 1:25 | 0.2:5 | 70.4 | 58.7 | Synergy |
| 17 | A1 + etoxazole = 1:2.5 | 0.4:1 | 71.8 | 58.4 | Synergy |
| 18 | A1 + etoxazole = 1:1 | 0.4:0.4 | 60.5 | 43.3 | Synergy |
| 19 | A1 + etoxazole = 2:1 | 0.8:0.4 | 88.4 | 78.4 | Synergy |
| 20 | A1 + etoxazole = 4:1 | 0.8:0.2 | 85.8 | 75.2 | Synergy |
| 21 | A1 + etoxazole = 20:1 | 0.8:0.04 | 76.8 | 72.7 | Synergy |
| 22 | A1 + etoxazole = 80:1 | 0.8:0.01 | 74.6 | 72.7 | Synergy |
| 23 | A9 + etoxazole = 1:125 | 0.04:5 | 57.6 | 43.6 | Synergy |
| 24 | A9 + etoxazole = 1:25 | 0.2:5 | 75.3 | 65.7 | Synergy |
| 25 | A9 + etoxazole = 1:2.5 | 0.4:1 | 65.0 | 53.0 | Synergy |
| 26 | A9 + etoxazole = 1:1 | 0.4:0.4 | 57.9 | 49.7 | Synergy |
| 27 | A9 + etoxazole = 2:1 | 0.8:0.4 | 82.3 | 72.2 | Synergy |
| 28 | A9 + etoxazole = 4:1 | 0.8:0.2 | 77.4 | 67.9 | Synergy |
| 29 | A9 + etoxazole = 20:1 | 0.8:0.04 | 72.9 | 64.6 | Synergy |
| 30 | A9 + etoxazole = 80:1 | 0.8:0.01 | 73.8 | 64.6 | Synergy |

Example 5

Compounds A1 and A9 were tested for their synergistic effects on adult *Tetranychus cinnabarinus* Boi when mixed with avermectin. The test results were shown in Table 5.

TABLE 5

| Number | Raw drug or combination | Concentration (mg/L) | 72 h mortality rate (%) | Theoretical mortality rate (%) | Synergy |
|---|---|---|---|---|---|
| 1 | A1 | 0.8 | 72.6 | / | / |
| 2 | | 0.4 | 41.7 | / | / |
| 3 | | 0.2 | 28.1 | / | / |
| 4 | | 0.04 | 0 | / | / |
| 5 | A9 | 0.8 | 67.1 | / | / |
| 6 | | 0.4 | 40.8 | / | / |
| 7 | | 0.2 | 27.5 | / | / |
| 8 | | 0.04 | 0 | / | / |
| 9 | avermectin | 0.02 | 70.0 | / | / |
| 10 | | 0.01 | 37.3 | / | / |
| 11 | | 0.0025 | 14.8 | / | / |
| 12 | | 0.0005 | 0 | / | / |
| 13 | A1 + avermectin = 2:1 | 0.04:0.02 | 79.8 | 70.0 | Synergy |
| 14 | A1 + avermectin = 4:1 | 0.04:0.01 | 50.2 | 37.3 | Synergy |
| 15 | A1 + avermectin = 10:1 | 0.2:0.02 | 85.3 | 78.4 | Synergy |
| 16 | A1 + avermectin = 16:1 | 0.04:0.0025 | 24.4 | 14.8 | Synergy |
| 17 | A1 + avermectin = 20:1 | 0.4:0.02 | 80.2 | 70.9 | Synergy |
| 18 | A1 + avermectin = 40:1 | 0.8:0.02 | 95.8 | 91.8 | Synergy |
| 19 | A1 + avermectin = 80:1 | 0.2:0.0005 | 46.5 | 28.1 | Synergy |
| 20 | A9 + avermectin = 2:1 | 0.04:0.02 | 80.7 | 70.0 | Synergy |
| 21 | A9 + avermectin = 4:1 | 0.04:0.01 | 48.1 | 37.3 | Synergy |
| 22 | A9 + avermectin = 10:1 | 0.2:0.02 | 85.8 | 78.3 | Synergy |
| 23 | A9 + avermectin = 16:1 | 0.04:0.0025 | 20.0 | 14.8 | Synergy |
| 24 | A9 + avermectin = 20:1 | 0.4:0.02 | 87.9 | 82.2 | Synergy |
| 25 | A9 + avermectin = 40:1 | 0.8:0.02 | 94.5 | 90.1 | Synergy |
| 26 | A9 + avermectin = 80:1 | 0.2:0.0005 | 45.0 | 27.5 | Synergy |

Example 6

Compounds A1 and A9 were tested for their synergistic effects on adult *Tetranychus cinnabarinus* Boi when mixed with clofentezine. The test results were shown in Table 6.

TABLE 6

| Number | Raw drug or combination | Concentration (mg/L) | 72 h mortality rate (%) | Theoretical mortality rate (%) | Synergy |
|---|---|---|---|---|---|
| 1 | A1 | 0.8 | 74.1 | / | / |
| 2 | | 0.4 | 42.3 | / | / |
| 3 | | 0.2 | 19.8 | / | / |
| 4 | | 0.04 | 0 | / | / |
| 5 | A9 | 0.8 | 65.8 | / | / |
| 6 | | 0.4 | 34.5 | / | / |
| 7 | | 0.2 | 22.4 | / | / |
| 8 | | 0.04 | 0 | / | / |
| 9 | clofentezine | 40 | 41.3 | / | / |
| 10 | | 8 | 18.2 | / | / |
| 11 | | 1 | 9.1 | / | / |
| 12 | | 0.2 | 0 | / | / |
| 13 | | 0.04 | 0 | / | / |
| 14 | A1 + clofentezine = 1:1 | 0.2:0.2 | 33.1 | 19.2 | Synergy |
| 15 | A1 + clofentezine = 2:1 | 0.4:0.2 | 55.2 | 42.3 | Synergy |
| 16 | A1 + clofentezine = 4:1 | 0.8:0.2 | 86.5 | 74.1 | Synergy |
| 17 | A1 + clofentezine = 20:1 | 0.8:0.04 | 86.6 | 74.1 | Synergy |
| 18 | A1 + clofentezine = 1:5 | 0.2:1 | 44.6 | 27.1 | Synergy |
| 19 | A1 + clofentezine = 1:10 | 0.8:8 | 83.9 | 78.8 | Synergy |
| 20 | A1 + clofentezine = 1:25 | 0.04:1 | 26.3 | 9.1 | Synergy |
| 21 | A1 + clofentezine = 1:50 | 0.8:40 | 90.5 | 84.8 | Synergy |
| 22 | A9 + clofentezine = 1:1 | 0.2:0.2 | 36.3 | 22.4 | Synergy |
| 23 | A9 + clofentezine = 2:1 | 0.4:0.2 | 43.6 | 34.5 | Synergy |
| 24 | A9 + clofentezine = 4:1 | 0.8:0.2 | 77.7 | 65.8 | Synergy |
| 25 | A9 + clofentezine = 20:1 | 0.8:0.04 | 76.8 | 65.8 | Synergy |
| 26 | A9 + clofentezine = 1:5 | 0.2:1 | 39.3 | 29.5 | Synergy |
| 27 | A9 + clofentezine = 1:10 | 0.8:8 | 77.0 | 72.0 | Synergy |
| 28 | A9 + clofentezine = 1:25 | 0.04:1 | 31.1 | 9.1 | Synergy |
| 29 | A9 + clofentezine = 1:50 | 0.8:40 | 85.5 | 79.9 | Synergy |

Example 7

Compounds A1 and A9 were tested for their synergistic effects on adult *Tetranychus cinnabarinus* Boi when mixed with hexythiazox. The test results were shown in Table 7.

TABLE 7

| Number | Raw drug or combination | Concentration (mg/L) | 72 h mortality rate (%) | Theoretical mortality rate (%) | Synergy |
|---|---|---|---|---|---|
| 1 | A1 | 0.8 | 74.1 | / | / |
| 2 | | 0.4 | 42.3 | / | / |
| 3 | | 0.2 | 19.8 | / | / |
| 4 | | 0.04 | 0 | / | / |
| 5 | A9 | 0.8 | 65.8 | / | / |
| 6 | | 0.4 | 34.5 | / | / |
| 7 | | 0.2 | 22.4 | / | / |
| 8 | | 0.04 | 0 | / | / |
| 9 | hexythiazox | 40 | 69.5 | / | / |
| 10 | | 8 | 36.3 | / | / |
| 11 | | 1 | 21.3 | / | / |
| 12 | | 0.2 | 12.8 | / | / |
| 13 | | 0.04 | 0 | / | / |
| 14 | A1 + hexythiazox = 1:1 | 0.4:0.4 | 59.1 | 49.7 | Synergy |
| 15 | A1 + hexythiazox = 2:1 | 0.8:0.4 | 83.8 | 77.4 | Synergy |
| 16 | A1 + hexythiazox = 1:1 | 0.2:0.02 | 28.7 | 19.8 | Synergy |
| 17 | A1 + hexythiazox = 40:1 | 0.8:0.02 | 82.2 | 74.1 | Synergy |
| 18 | A1 + hexythiazox = 1:10 | 0.04:0.4 | 27.7 | 12.8 | Synergy |
| 19 | A1 + hexythiazox = 1:25 | 0.2:5 | 61.6 | 48.9 | Synergy |
| 20 | A1 + hexythiazox = 1:50 | 0.2:10 | 85.8 | 75.5 | Synergy |
| 21 | A9 + hexythiazox = 1:1 | 0.4:0.4 | 54.7 | 42.9 | Synergy |
| 22 | A9 + hexythiazox = 2:1 | 0.8:0.4 | 78.2 | 70.2 | Synergy |
| 23 | A9 + hexythiazox = 1:1 | 0.2:0.02 | 30.1 | 22.4 | Synergy |
| 24 | A9 + hexythiazox = 40:1 | 0.8:0.02 | 75.8 | 65.8 | Synergy |
| 25 | A9 + hexythiazox = 1:10 | 0.04:0.4 | 22.0 | 12.8 | Synergy |
| 26 | A9 + hexythiazox = 1:25 | 0.2:5 | 60.4 | 50.6 | Synergy |
| 27 | A9 + hexythiazox = 1:50 | 0.2:10 | 85.9 | 76.3 | Synergy |

The composition provided by the present invention have the advantages of increasing effectiveness and expanding spectrum of control, and can be used to control a variety of pests (especially mites) and plant diseases caused by a variety of fungi, bacteria, nematodes and viruses.

The above describes in detail the preferred embodiments of the present invention, however, the invention is not limited thereto. Within the technical conception of the present invention, a variety of simple variants of the technical solution of the present invention can be made, including the combination of individual technical features in any other suitable manner, and these simple variants and combinations shall likewise be considered as disclosed in the present invention and all fall within the scope of protection of the present invention.

The invention claimed is:

1. A composition comprising an active component a and an active component b, wherein the active component a is a compound as shown in general formula A,

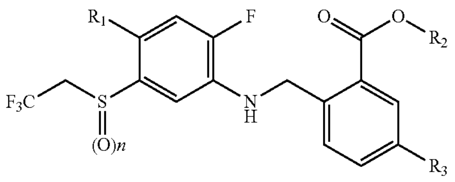

A wherein n is 0 or 1;

$R_1$ is methyl or chlorine;

$R_2$ is methyl, ethyl, propyl, butyl, isopropyl, cyclopropyl, cyclopropylmethyl, allyl, propargyl, fluoroethyl, difluoroethyl, trifluoroethyl, chloroethyl, trichloroethyl, or cyanoethyl;

$R_3$ is hydrogen or fluorine;

the active component b is selected from chloride channel agonist insecticide b4, mite growth inhibitor insecticide b6, ATP synthase inhibitor insecticide b8, mitochondrial electron transport complex III inhibitor insecticide b12, acetyl coenzyme A carboxylase inhibitor insecticide b15 or mitochondrial electron transport complex II inhibitor insecticide b16.

2. The composition of claim 1, wherein the active component a and the active component b have a weight ratio of 150:1 to 1:150.

3. The composition of claim 1, wherein the active component a is selected from the compounds as shown in the structure of:

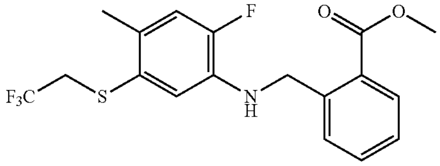

I-53

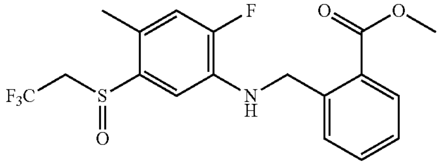

I-54

-continued

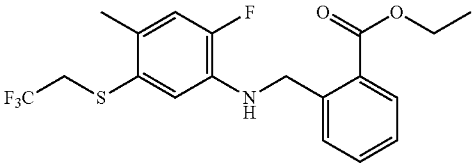

I-55

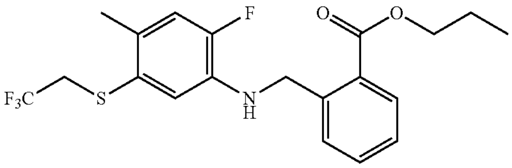

I-57

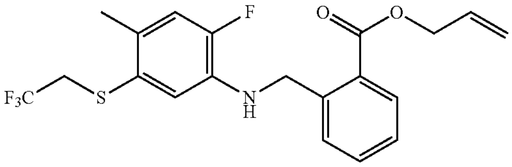

I-69

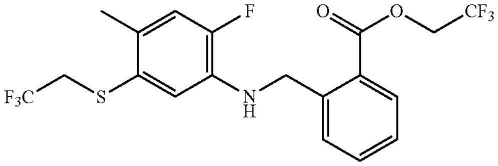

I-71

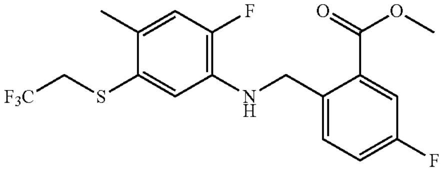

I-303

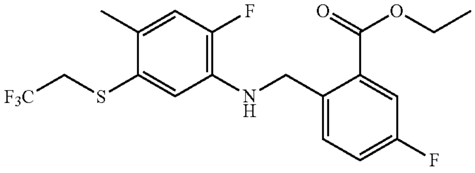

I-305

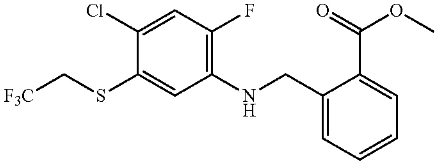

I-1202

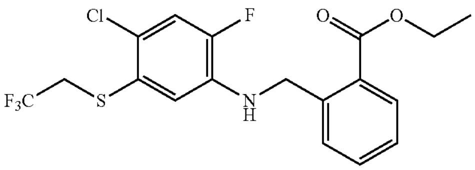

I-1204

-continued

I-1206

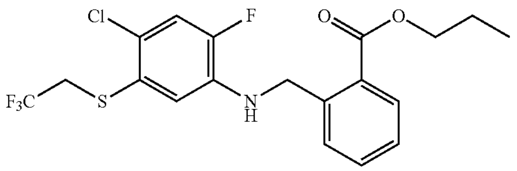

I-1218

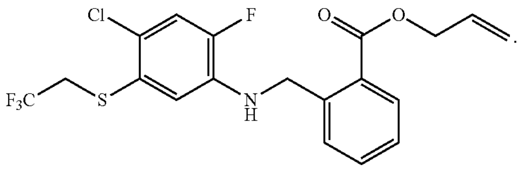

4. A method of controlling pest or disease, the method comprising applying the composition of claim 1.

5. The use method of claim 4, wherein the composition is used in the control of pest, mite or disease by applying directly or indirectly at an effective dose of 10-5000 g per hectare to the insect, mite or fungus to be controlled or to the medium in which it grows.

6. A method of controlling mite infestation, the method comprising applying a composition, wherein the composition comprises an active component a and an active component b, wherein the active component a comprises a compound having the structure as shown in formula I-53 and/or formula I-1202; the active component b is selected from clofentezine and/or hexythiazox;

I-53

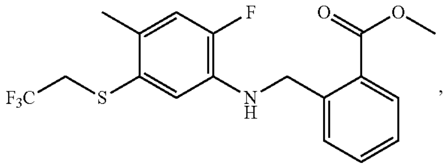

,

I-1202

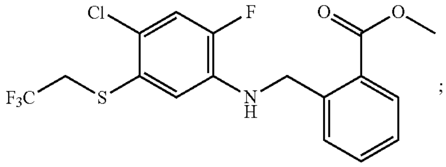

;

wherein the weight ratio of active component a and active component b is 1:(5-30).

7. The method of claim 4, wherein the pest is mite.

8. The composition of claim 2, wherein the active component a is selected from the compounds as shown in the structure of:

I-53

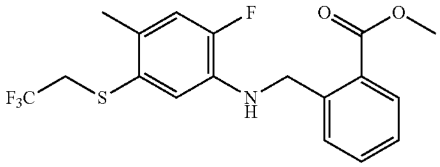

-continued

I-54

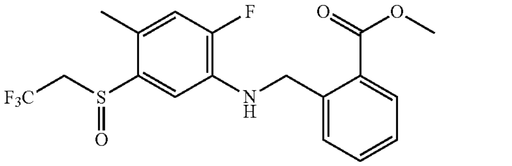

I-55

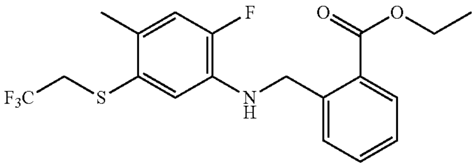

I-57

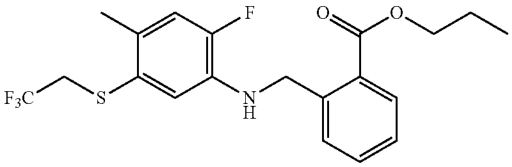

I-69

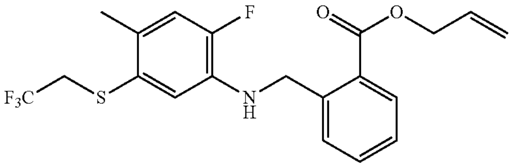

I-71

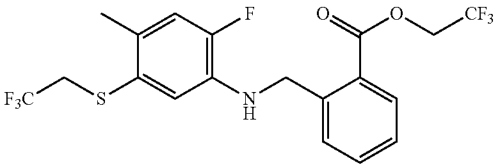

I-303

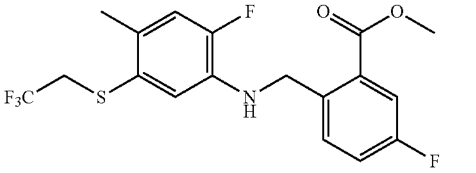

I-305

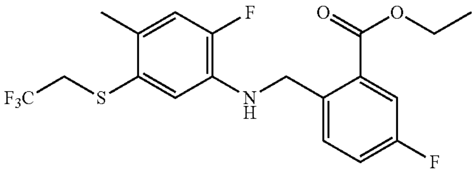

I-1202

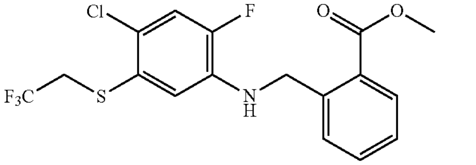

-continued

I-1204

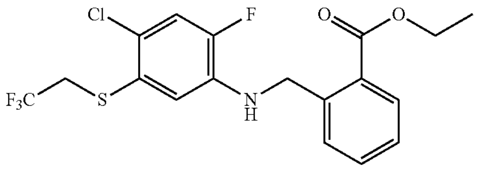

I-1206

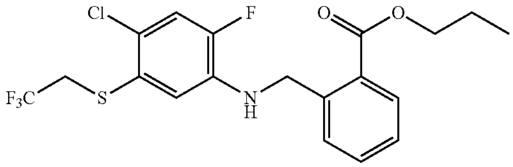

-continued

I-1218

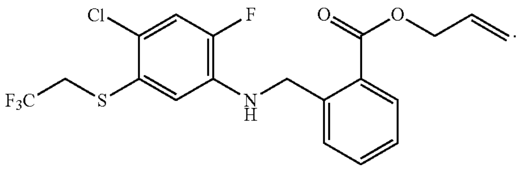

9. A method of controlling pest or disease, the method comprising applying the composition of claim 2.

10. The method of claim 9, wherein the pest is mite.

11. The method of claim 9, wherein the composition is used in the control of pest, mite or disease by applying directly or indirectly at an effective dose of 10-5000 g per hectare to the insect, mite or fungus to be controlled or to the medium in which it grows.

12. The composition of claim 1, wherein the active component b is selected from spiromesifen, spirodiclofen, cyetpyrafen, propargite, etoxazole, avermectin, clofentezine, hexythiazox or bifenazate.

* * * * *